(12) United States Patent
Yamagishi et al.

(10) Patent No.: US 10,334,323 B2
(45) Date of Patent: Jun. 25, 2019

(54) RECEPTION APPARATUS, RECEPTION METHOD, TRANSMISSION APPARATUS, AND TRANSMISSION METHOD

(71) Applicant: SONY CORPORATION, Tokyo (JP)

(72) Inventors: Yasuaki Yamagishi, Kanagawa (JP); Naohisa Kitazato, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/304,579

(22) PCT Filed: Apr. 13, 2015

(86) PCT No.: PCT/JP2015/061312
§ 371 (c)(1),
(2) Date: Oct. 17, 2016

(87) PCT Pub. No.: WO2015/163172
PCT Pub. Date: Oct. 29, 2015

(65) Prior Publication Data
US 2017/0048593 A1 Feb. 16, 2017

(30) Foreign Application Priority Data
Apr. 24, 2014 (JP) ................... 2014-090102

(51) Int. Cl.
*H04N 21/643* (2011.01)
*H04N 21/235* (2011.01)
*H04N 21/435* (2011.01)

(52) U.S. Cl.
CPC ......... *H04N 21/643* (2013.01); *H04N 21/235* (2013.01); *H04N 21/435* (2013.01)

(58) Field of Classification Search
CPC ............. H04N 21/2225; H04N 21/235; H04N 21/435; H04N 21/643
See application file for complete search history.

(56) References Cited

U.S. PATENT DOCUMENTS

| 2013/0291040 A1 | 10/2013 | Rhyu et al. |
| 2014/0189772 A1* | 7/2014 | Yamagishi ......... H04N 21/2225 725/116 |
| 2015/0127845 A1* | 5/2015 | Phillips ............... H04L 65/601 709/231 |

FOREIGN PATENT DOCUMENTS

| EP | 3063945 A1 | 9/2016 |
| JP | 2014-508448 | 4/2014 |

(Continued)

OTHER PUBLICATIONS

"Information technology—Dynamic adaptive streaming over HTTP (DASH), Part 1: Media presentation description and segment formats", ISO/IEC 23009-1, First edition, Apr. 1, 2012, pp. 134.

(Continued)

*Primary Examiner* — Hunter B Lonsberry
(74) *Attorney, Agent, or Firm* — Oblon, McClelland, Maier & Neustadt, L.L.P.

(57) ABSTRACT

The present technology relates to a reception apparatus, a reception method, a transmission apparatus, and a transmission method that make it possible to provide a broadcasting service by using MPEG-DASH. Provided is a reception apparatus including a control unit that performs, on the basis of a relationship among a plurality of elements which is prescribed in advance in an MPD conforming to a standard of MPEG-DASH which is transmitted via a broadcast wave or a communication network of digital broadcasting, and a first element for grouping of target elements in a specific layer in which selection or structuring of a component having a structure including a plurality of layers for the selection and the structuring is performed, at least one of the selection and the structuring of the component, and controls reproduction of a content constituted of one or more components. The present technology can be applied to a television receiver, for example.

18 Claims, 27 Drawing Sheets

(56) References Cited

FOREIGN PATENT DOCUMENTS

| JP | 2014-508448 A | 4/2014 |
|---|---|---|
| WO | 2014/007083 A1 | 1/2014 |
| WO | WO2014007083 A1 | 1/2014 |
| WO | 2014/042028 A1 | 3/2014 |
| WO | WO2014042028 A1 | 3/2014 |
| WO | WO 2015/063734 A1 | 5/2015 |

OTHER PUBLICATIONS

"Information technology—Dynamic adaptive streaming over HTTP (DASH)—Part 1: Media presentation description and segment formats", ISO/IEC 23009-1, First edition, Apr. 1, 2012, pp. 1-134.
European Office Action dated Nov. 5, 2018 issued in Application No. 15 783 820.2-1208, 5 pages.
Stockhammer, et al., "Dash in Mobile Networks and Services", Visual Communications and Image Processing (VCIP) 2012 IEEE.
Information technology—Dynamic adaptive streaming over HTIP (DASH), Part 1: Media presentation description and segment formats, IS0/IEC FDIS 23009-1, Aug. 2, 2013 (150 pgs.).
Japanese Office Action dated Mar. 28, 2019 in Application No. 2016-514865 (no English translation), 4 pages.

\* cited by examiner

```
<MPD>
  <Period>
    <AdaptationSet>
      <Representation>
        <SubRepresentation>
        ...
        </SubRepresentation>
        <SubRepresentation>
        ...
        </SubRepresentation>
      </Representation>
      <Representation>
      ...
      </Representation>
    </AdaptationSet>
    <AdaptationSet>
    ...
    </AdaptationSet>
  </Period>
  <Period>
  ...
  </Period>
</MPD>
```

FIG.2

RECEPTION APPARATUS, RECEPTION METHOD, TRANSMISSION APPARATUS, AND TRANSMISSION METHOD

CROSS REFERENCE TO RELATED APPLICATIONS

This application is a U.S. National Phase of International Patent Application No. PCT/JP2015/061312 filed on Apr. 13, 2015, which claims priority benefit of Japanese Patent Application No. JP 2014-090102 filed in the Japan Patent Office on Apr. 24, 2014. Each of the above-referenced applications is hereby incorporated herein by reference in its entirety.

TECHNICAL FIELD

The present technology relates to a reception apparatus, a reception method, a transmission apparatus, and a transmission method, and specifically to a reception apparatus, a reception method, a transmission apparatus, and a transmission method that make it possible to provide broadcasting service by using MPEG-DASH.

BACKGROUND ART

As a trend of standardization in the Internet streaming such as an IPTV (Internet Protocol Television), a system which is applied to VoD (Video On Demand) streaming by HTTP (Hypertext Transfer Protocol) streaming and live streaming is standardized. In particular, MPEG-DASH (Moving Picture Expert Group-Dynamic Adaptive Streaming over HTTP) that is standardized by ISO/IEC/MPEG is attracting attention (see, for example, Non-Patent Document 1).

The MPEG-DASH obtains and reproduces streaming data in accordance with a metafile called MPD (Media Presentation Description) and an address (URL: Uniform Resource Locator) of medium data such as chunked audio, video, or caption to be described therein.

In the stream (Representation) of the medium data described in the MPD, a plurality of candidates having different attributes is enumerated. An application (for example, stream player or the like) that processes the MPD selects an optimal stream in accordance with a current network environment condition from streams of the plurality of candidates, and obtains and reproduces the stream.

If the network environment is changed, in accordance with this, a stream to be obtained is changed. Further, as a reference of the selection, it is assumed that the selection is performed by an end user (viewer), or a capability attribute of a device (for example, equipped function, system attribute (for example, codec or the like), capability attribute (for example, a memory capacity, a processing capability, or the like)) or the like.

Non-Patent Document 1: ISO/IEC 23009-1:2012 Information technology Dynamic adaptive streaming over HTTP (DASH)

SUMMARY OF INVENTION

Problem to be Solved by the Invention

Incidentally, providing broadcasting services by using the MPEG-DASH is assumed, but a technology system for providing the broadcasting services is not established.

The present technology has been made in view of the circumstances described above, and makes it possible to provide broadcasting services by using the MPEG-DASH.

Means for Solving the Problem

A reception apparatus according to a first aspect of the present technology includes: a reception unit that receives a broadcast wave of digital broadcasting; and a control unit that performs, on the basis of a relationship among a plurality of elements which is prescribed in advance in an MPD (Media Presentation Description) conforming to a standard of MPEG-DASH (Moving Picture Expert Group-Dynamic Adaptive Streaming over HTTP) which is transmitted via the broadcast wave or a communication network, and a first element for grouping of target elements in a specific layer in which selection or structuring of a component having a structure including a plurality of layers for the selection and the structuring is performed, at least one of the selection and the structuring of the component, and controls reproduction of a content constituted of one or more components.

The layer structure can include a first layer, a second layer, and a third layer, the third layer can be a layer for adaptive selection of the component, the second layer can be a layer for structuring of the component selected in the third layer and a component which is not a target of the third layer into one component, and the first layer can be a layer for selection of one component from among the component structured in the second layer, the component selected in the third layer, and a component which is not a target of the second layer and the third layer.

A function of the third layer can be achieved by using a relationship between an AdaptationSet element and a Representation element of the MPD, a function of the second layer can be achieved by grouping a plurality of elements as targets of structuring of the component by the first element, and a function of the first layer can be achieved by grouping a plurality of elements as targets of selection of the component by the first element.

The first element can be an EssentialProperty element or a SupplementalProperty element, and the elements as the targets to be grouped can be specified by a schemeIdUri attribute and a value attribute of the EssentialProperty element or the SupplementalProperty element.

The function of the second layer can be achieved by grouping the component selected in the third layer and the component which is not the target of the third layer by an identical group ID.

The function of the first layer can be achieved by grouping the component structured in the second layer, the component selected in the third layer, and the component which is not the targets of the second layer and the third layer by an identical group ID.

The MPD can include a second element that specifies a set of AdaptationSet elements outside of a regulation relating to the structure including the plurality of layers.

The second element can be a Subset element, and the set of the AdaptationSet elements can be specified by a contains attribute of the Subset element.

The function of the third layer can be achieved by grouping a plurality of elements as targets of selection of the component by the first element, the function of the second layer can be achieved by grouping a plurality of elements as targets of structuring of the component by the first element, and the function of the first layer can be achieved by using a relationship between an AdaptationSet element and a Representation element of the MPD.

The first element can be an EssentialProperty element or a SupplementalProperty element, and the elements as the targets to be grouped can be specified by a schemeIdUri attribute and a value attribute of the EssentialProperty element or the SupplementalProperty element.

The function of the third layer can be achieved by grouping components adaptively selected in the third layer by an identical group ID.

The function of the second layer can be achieved by grouping components structured in the second layer by using a relationship between a Representation element and a SubRepresentation element of the MPD.

The MPD can include a second element that specifies a set of Representation elements outside of a regulation relating to the structure including the plurality of layers.

The second element can be a Subset element, and the set of the Representation elements can be specified by a contains attribute of the Subset element.

The component can be transmitted via the broadcast wave or the communication network.

The reception apparatus may be an independent apparatus or may be an internal block that constitutes one apparatus.

A reception method according to the first aspect of the present technology corresponds to the reception apparatus according to the first aspect of the present technology described above.

In the reception apparatus and the reception method according to the first aspect of the present technology, the broadcast wave of the digital broadcasting is received, on the basis of the relationship among the plurality of elements which is prescribed in advance in the MPD conforming to the standard of MPEG-DASH which is transmitted via the broadcast wave or the communication network, and the first element for grouping the target elements in the specific layer in which selection or structuring of the component having the structure including the plurality of layers for the selection and the structuring is performed, at least one of the selection and the structuring of the component is performed, and reproduction of the content constituted of one or more components is controlled.

A transmission apparatus according to a second aspect of the present technology includes: a generation unit that performs, on the basis of a relationship among a plurality of elements which is prescribed in advance in an MPD conforming to a standard of MPEG-DASH, and a first element for grouping of target elements in a specific layer in which selection or structuring of a component having a structure including a plurality of layers for the selection and the structuring is performed, at least one of the selection and the structuring of the component, and generates the MPD including at least information that enables control of reproduction of a content constituted of one or more components; and a transmission unit that transmits the generated MPD via a broadcast wave or a communication network of digital broadcasting.

The transmission apparatus may be an independent apparatus or may be an internal block that constitutes one apparatus.

A transmission method according to the second aspect of the present technology corresponds to the transmission apparatus according to the second aspect of the present technology described above.

In the transmission apparatus and the transmission method according to the second aspect of the present technology, on the basis of the relationship among the plurality of elements which is prescribed in advance in the MPD conforming to the standard of MPEG-DASH, and the first element for grouping the target elements in the specific layer in which selection or structuring of the component having the structure including the plurality of layers for the selection and the structuring is performed, at least one of the selection and the structuring of the component is performed, the MPD including at least information that enables control of reproduction of the content constituted of one or more components is generated, and the generated MPD is transmitted via the broadcast wave or the communication network of the digital broadcasting.

Effects of the Invention

According to the first aspect and the second aspect of the present technology, it is possible to provide broadcasting services by using the MPEG-DASH.

It should be noted that the effects described herein are not necessarily limited, and any effect described in this specification may be obtained.

BRIEF DESCRIPTION OF DRAWINGS

FIG. 2 A diagram showing a description example of the MPD.

MODE(S) FOR CARRYING OUT THE INVENTION

Figure 1:
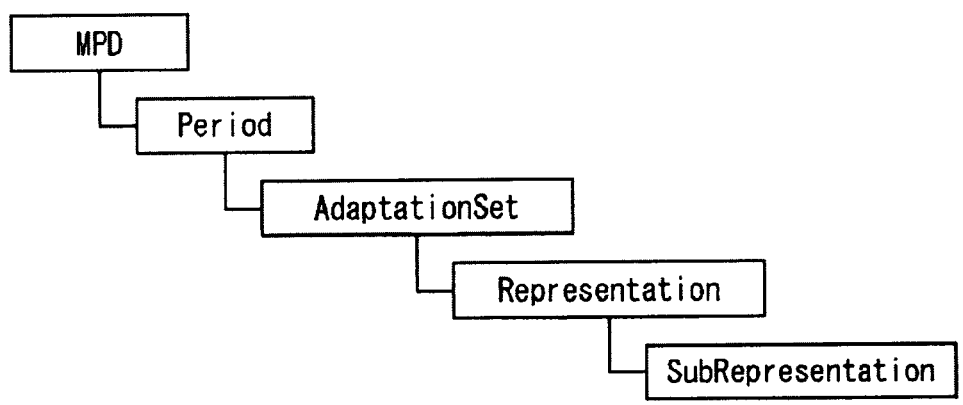
FIG. 1 A diagram showing the configuration of MPD.

Hereinafter, modes for carrying out the present technology will be described with reference to the drawings. It should be noted that the description will be given in the following order.
1. Structure of MPD
2. Component layer structure
3. First embodiment
(1) Method of achieving functions of layers at Levels
(1-1) Function of the layer at Level 3
(1-2) Function of the layer at Level 2
(1-3) Function of the layer at Level 1
(2) Specific operation examples
(2-1) Operation example 1: mixing reproduction of audio
(2-2) Operation example 2: Group selection of audio
(2-3) Operation example 3: Simultaneous presentation of video and audio
4. Second embodiment
(1) Method of achieving functions of layers at Levels
(1-1) Function of the layer at Level 3
(1-2) Function of the layer at Level 2
(1-3) Function of the layer at Level 1
(2) Specific operation examples
(2-1) Operation example 4: mixing reproduction of audio
(2-2) Operation example 5: Group selection of audio
(2-3) Operation example 6: Simultaneous presentation of video and audio
5. System configuration
6. Specific process flow in apparatuses
7. Configuration of computer

1. Structure of MPD

Structure of MPD

FIG. 1 is a diagram showing the structure of an MPD (Media Presentation Description). It should be noted that, as shown in a description example of FIG. 2, an MPD file is described in a layer structure in a markup language such as an XML (Extensible Markup Language).

Here, as shown in FIG. 1, the MPD is described in the layer structure including a Period element, an AdaptationSet element, a Representation element, and a SubRepresentation element. The Period element is a unit for describing the configuration of a content such as a program. Further, the AdaptationSet element, the Representation element, or the SubRepresentation element is used for each stream of video, audio, caption, or the like, and can describe an attribute of each stream.

Specifically, the AdaptationSet element represents a stream encoded from various sources. In order to cause a receiver side to select the stream in accordance with a parametric such as a bit rate, the Representation element is disposed in the AdaptationSet element to enumerate streams as a plurality of options which have different parameters such as a bit rate. Normally, the AdaptationSet element and the Representation element are corresponded to a single stream such as video, audio, and caption.

Figure 3:
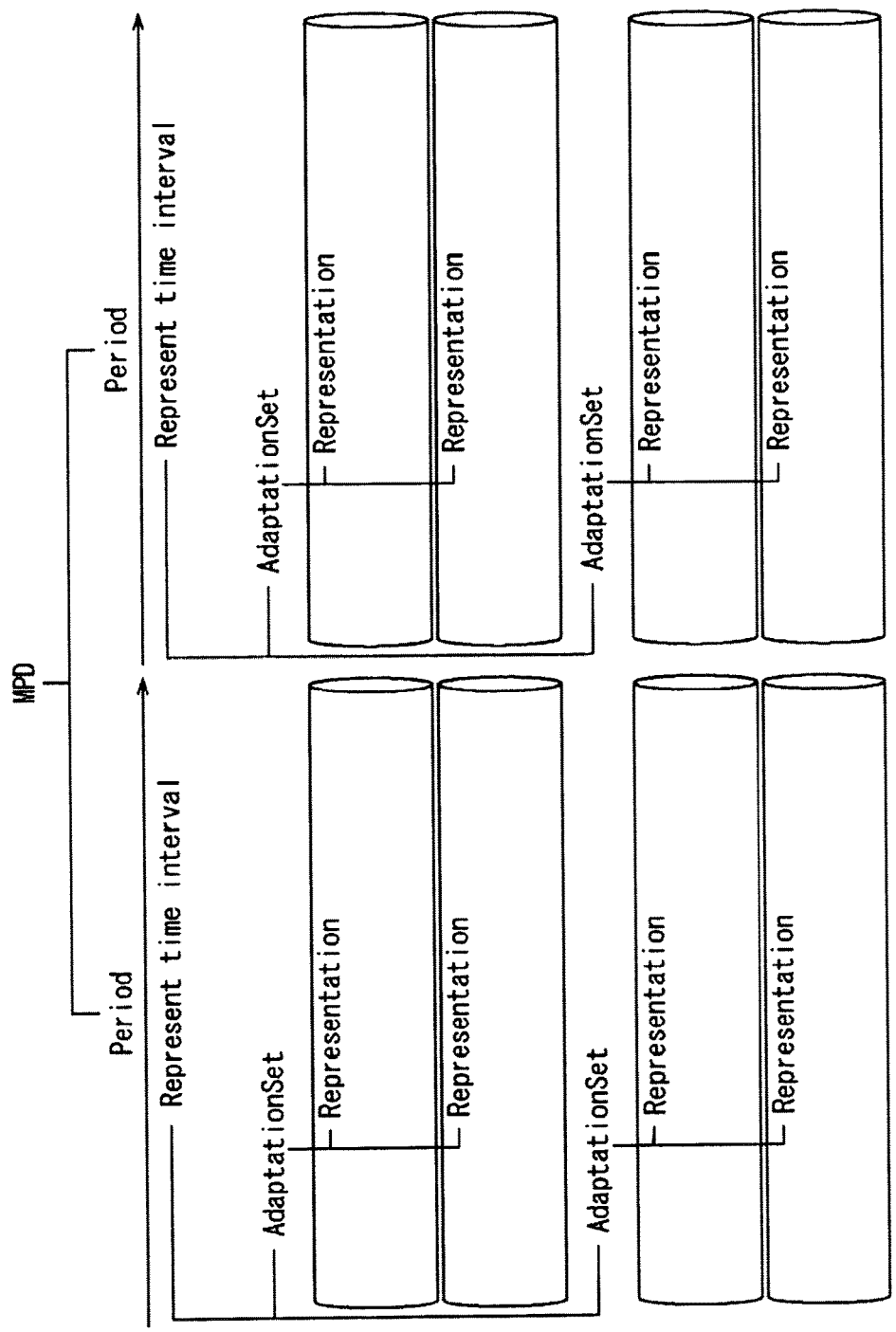
FIG. 3 A diagram showing a relationship between AdaptationSet elements and Representation elements in the case where a multiplexed stream is expressed.

Further, when the AdaptationSet element represents a stream obtained by multiplexing a plurality of streams such as a video stream, an audio stream, and a caption stream, in the AdaptationSet element, the Representation elements are disposed to enumerate the multiplexed streams as a plurality of options having different parameters such as a bit rate. That is, as shown in FIG. 3, for each Period element that represents a time interval, a plurality of AdaptationSet elements representing the multiplexed stream are disposed, and by a plurality of Representation elements disposed in the AdaptationSet elements, a plurality of multiplexed streams having different bit rates can be enumerated.

Figure 4:
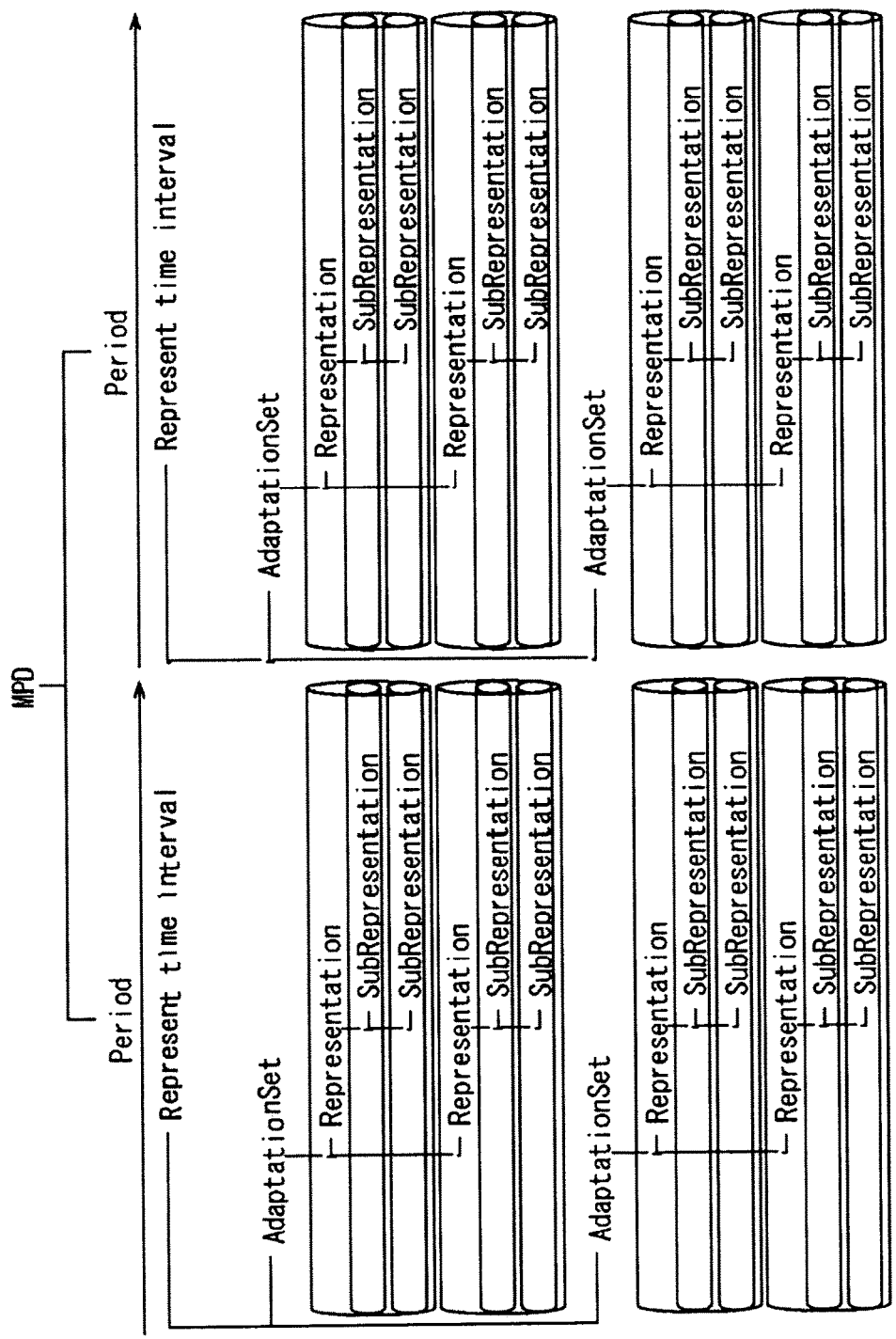
FIG. 4 A diagram showing a relationship among the AdaptationSet elements, the Representation elements, and SubRepresentation elements in the case where the multiplexed stream is expressed.

Further, in this case, under the Representation element, the SubRepresentation element is disposed, with the result that it is also possible to describe an attribute of the stream of components that constitute the multiplexed stream. That is, as shown in FIG. 4, for each Period element that represent the time interval, the plurality of AdaptationSet elements that represents the multiplexed stream is disposed, within the AdaptationSet elements, the plurality of Representation elements that represents the multiplexed stream having different bit rates is disposed, for example, and further, by the SubRepresentation elements disposed within the Representation elements, it is possible to describe the attribute of the video stream, the audio stream, or the caption stream, for example.

Figure 5:
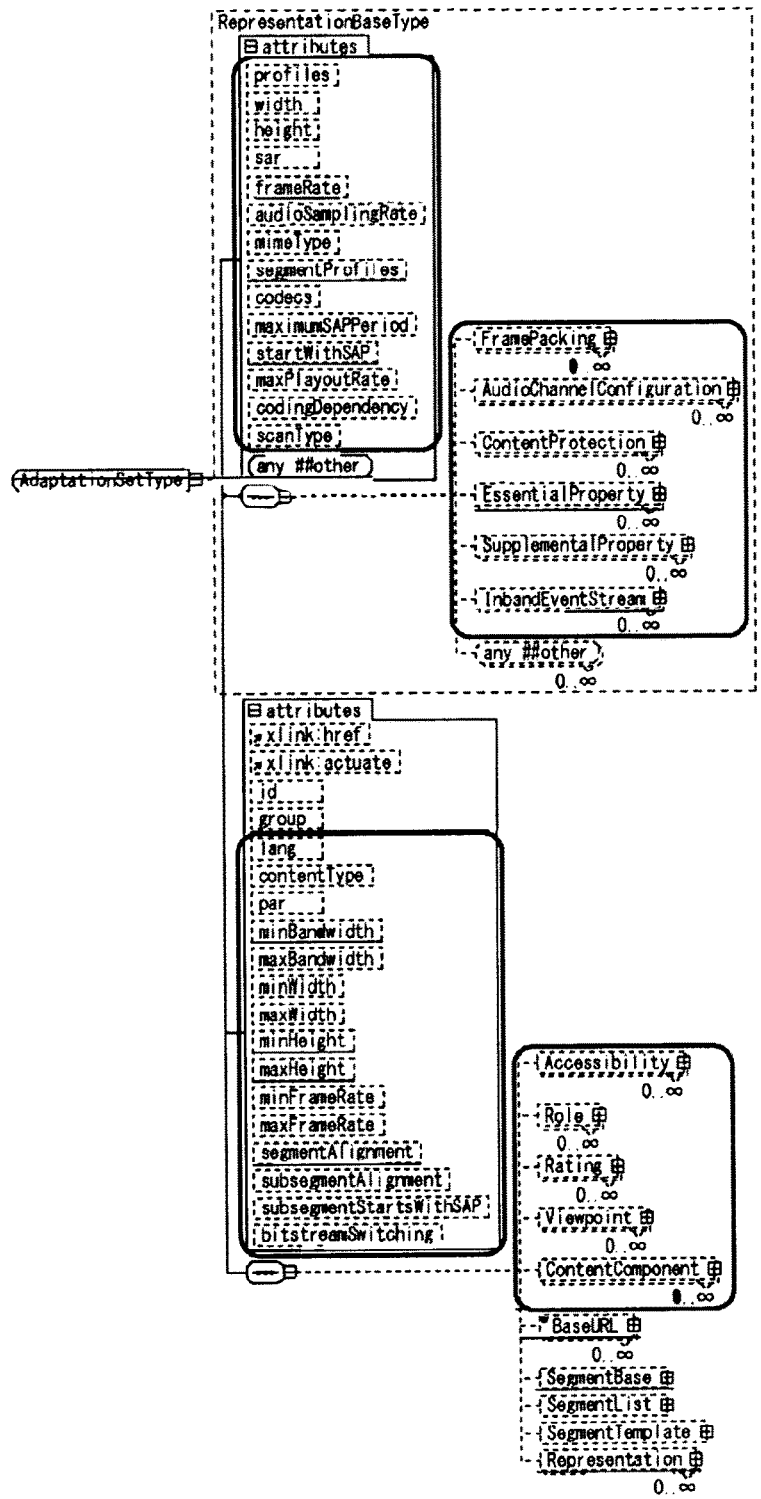
FIG. 5 A diagram showing an example of attributes and elements which can be included in the AdaptationSet element.
Figure 6:
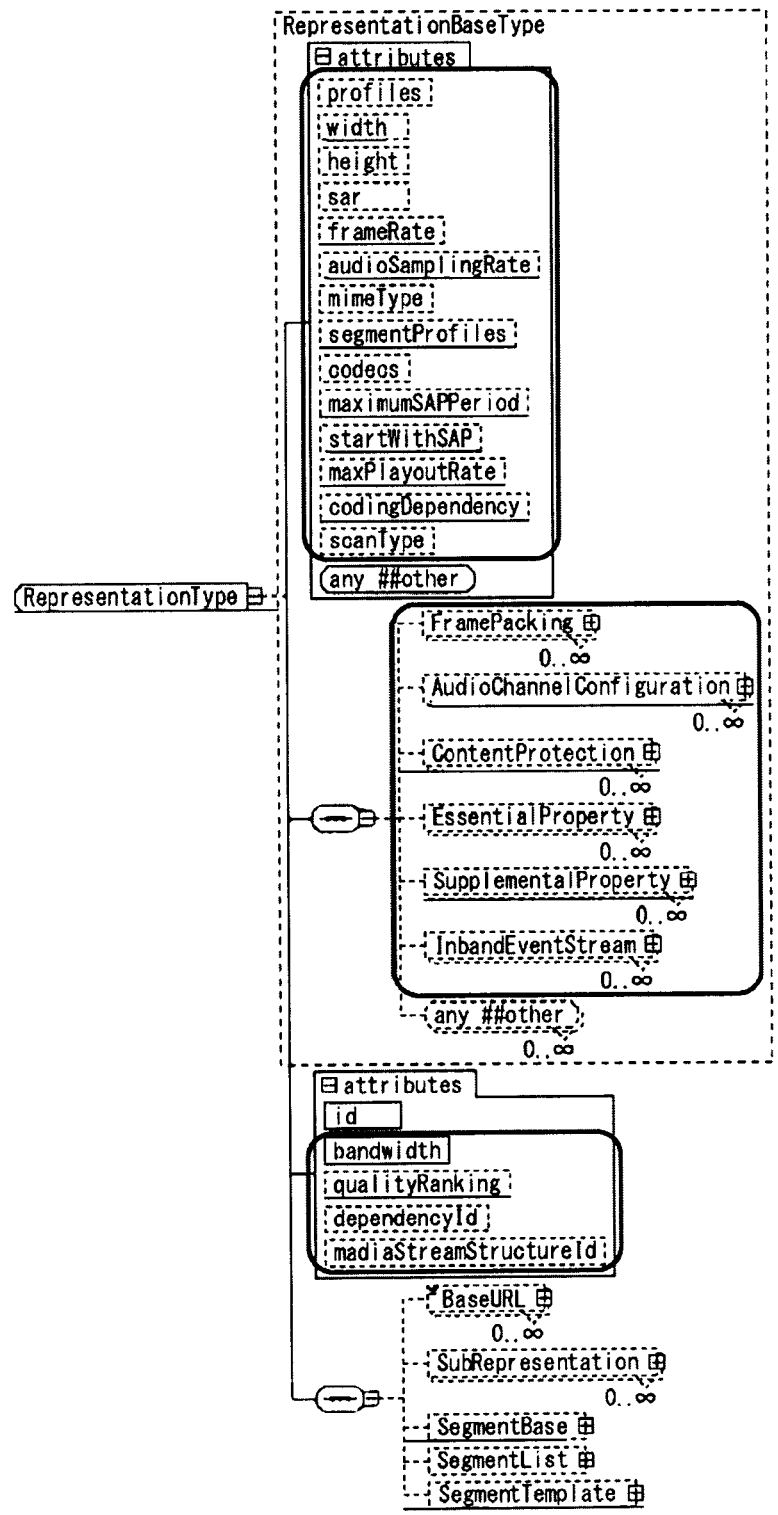
FIG. 6 A diagram showing an example of attributes and elements which can be included in the Representation element and the SubRepresentation element.

It should be noted that the AdaptationSet element corresponds to a stream obtained by multiplexing a plurality of streams, in addition to the single stream such as the video stream and the audio stream. In the MPEG-DASH standard, as attributes and elements which can be included in the AdaptationSet element described above, attributes and elements shown in FIG. 5 are already prescribed. Further, within the range of the AdaptationSet element as an upper element thereof (parent element), the Representation element enumerates streams as a plurality of options that have different parameters such as bit rate. In the MPEG-DASH standard, as attributes and elements that can be included in the Representation element described above, attributes and elements shown in FIG. 6 are already prescribed. It should be noted that the attributes and the elements shown in FIG. 6 can be included in the SubRepresentation element.

2. Component Layer Structure

Incidentally, as requirements in the broadcasting service, there are selection and structuring of components transmitted as a stream. Here, the selection of the components means that optimal components are selected in accordance with various conditions such as the capacity of a codec and a network environment to which a receiver corresponds. Further, the structuring of the components means that a plurality of components are combined and displayed at the same time, for example. To satisfy the requirements of the selection and structuring of the components as described above, the components are represented in a structure including the plurality of layers as shown in FIG. 7.

Figure 7:
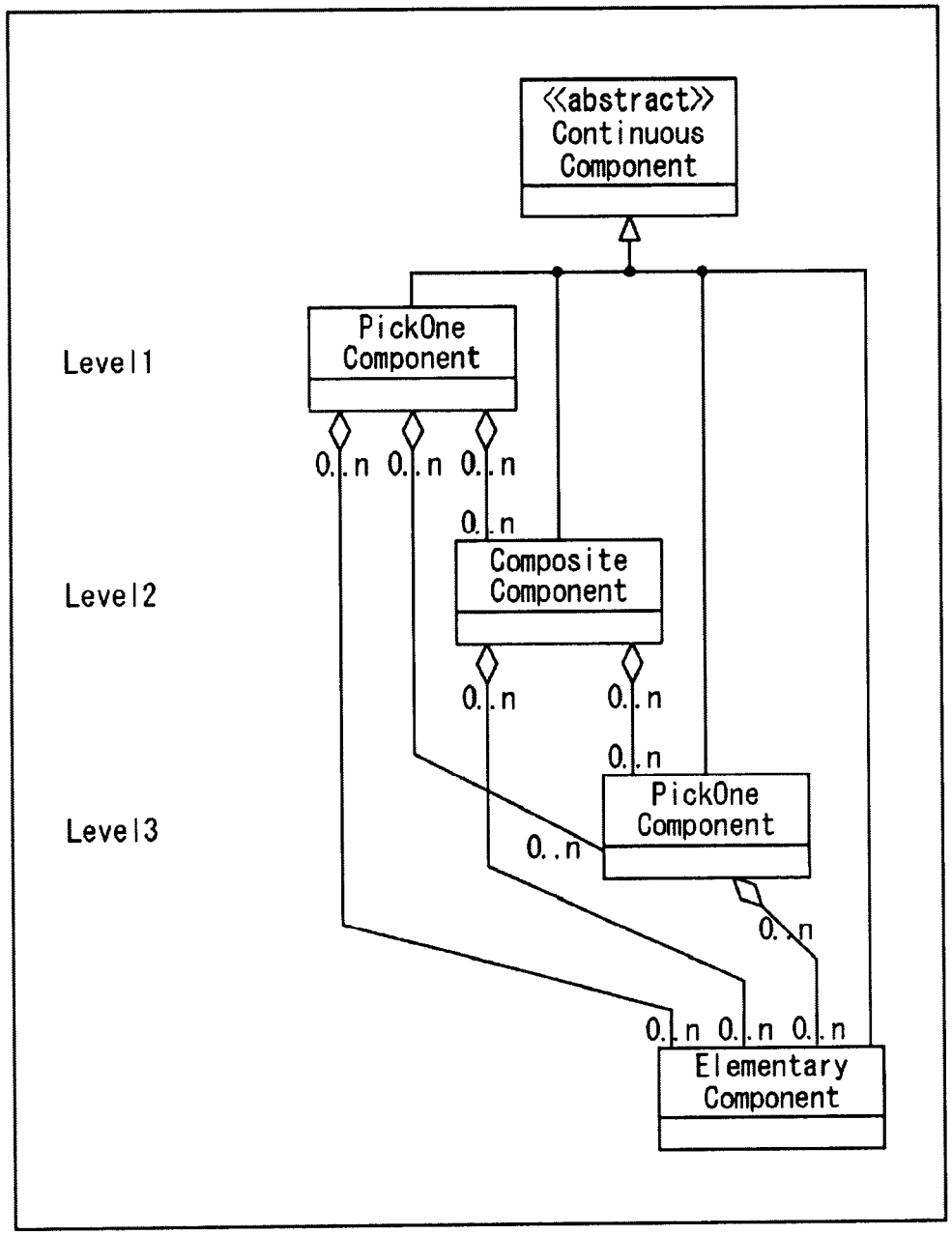
FIG. 7 A diagram showing a component layer structure.

In FIG. 7, a component layer is constituted of three layers of a layer at Level 1, a layer at Level 2, and a layer at Level 3. Further, in FIG. 7, an Elementary Component represents a component itself such as video, audio, and caption.

The layer at Level 3 corresponds to "Level 3" in the figure, and one component is selected from n (n: integer equal to or greater than 0) Elementary Components therein. Therefore, the layer at Level 3 can be said to be a layer of PickOneComponent. It should be noted that the layer at Level 3 may be called as another name, for example, an Adaptive Layer in some cases.

The layer at Level 2 corresponds to "Level 2" in the figure, and grouping (structuring) is performed therein in order to combine n (n: integer equal to or greater than 0) components or n (n: integer equal to or greater than 0) Elementary Components selected in the layer at Level 3 and display those at the same time. The plurality of components that has been grouped is regarded as one component collectively. Therefore, the layer at Level 2 can be said to be a layer of Composite Component. It should be noted that the layer at Level 2 may be called as another name, for example, Composite Layer in some cases.

The layer at Level 1 corresponds to "Level 1" in the figure, and one component is selected from the n (n: integer equal to or greater than 0) components grouped in the layer at Level 2, the n (n: integer equal to or greater than 0) components selected in the layer at Level 3, or the n (n: integer equal to or greater than 0) Elementary Components. Therefore, the layer at Level 1 can be said to be a layer of PickOneComponent. It should be noted that the layer at Level 1 may be called as another name, for example, Selective Layer in some cases.

As described above, by representing the components in the structure including the plurality of layers, for example, the layer at Level 1 and the layer at Level 3 satisfy the requirement of the component selection, and the layer at Level 2 satisfies the requirement of the component structuring. Hereinafter, in the case where the broadcasting service is provided by using the MPEG-DASH, specific methods for achieving the component layer structure shown in FIG. 7 will be described in two embodiments.

3. First Embodiment (1) Method of Achieving Functions of Layers at Levels

In the first embodiment, in the case where the broadcasting service is provided by using the MPEG-DASH, in order to satisfy a service requirement of the component layer structure shown in FIG. 7, it is possible to use an element already defined in an MPD standard specification. Hereinafter, a method of achieving functions of layers at Levels in the first embodiment will be described in detail.

(1-1) Function of the Layer at Level 3

Figure 8:
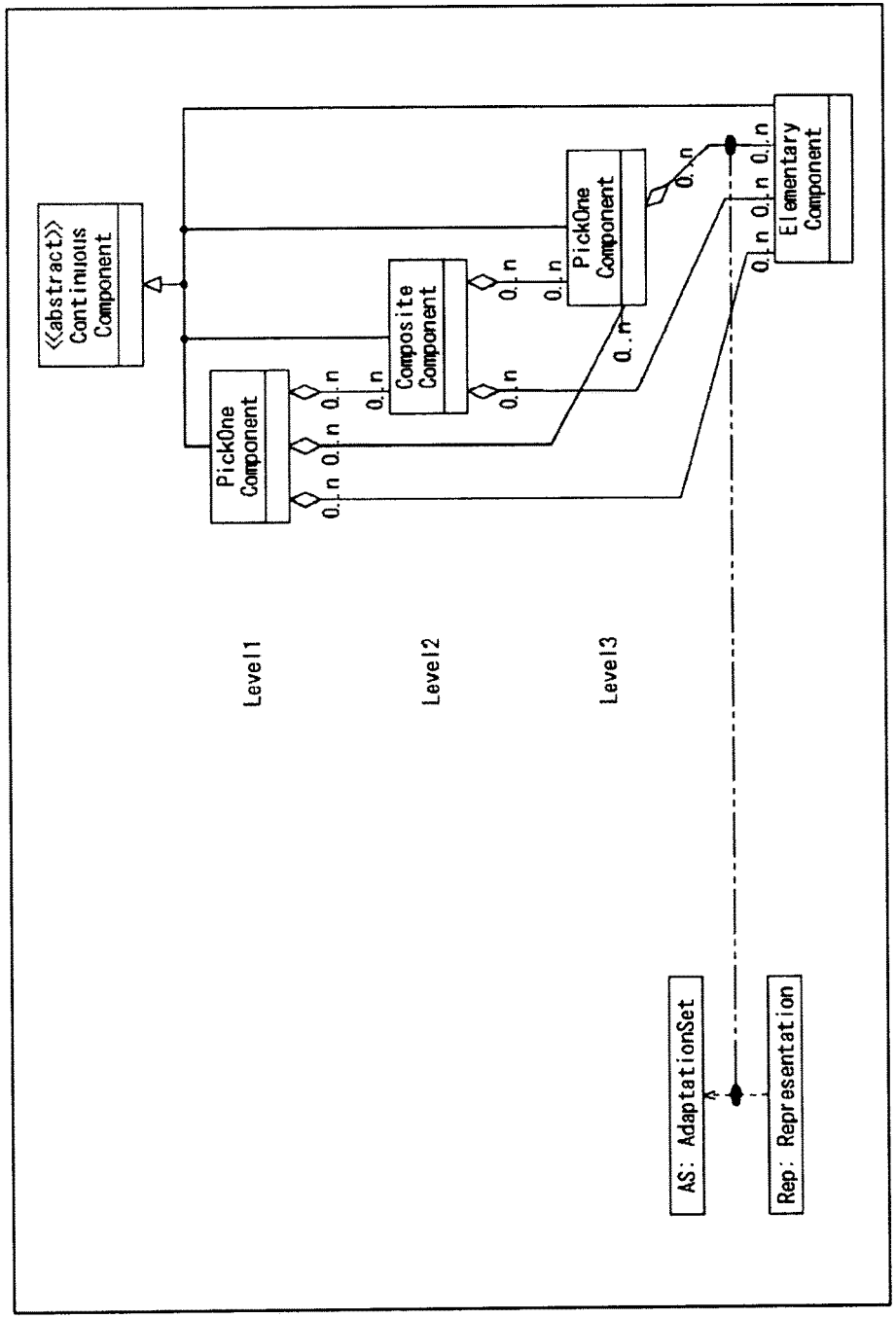
FIG. 8 A diagram showing a method of achieving a function of a layer at Level 3.

FIG. 8 is a diagram showing the method of achieving the function of the layer at Level 3. As shown in FIG. 8, the function of the layer at Level 3 can be achieved by mapping the PickOneComponent at Level 3 on the AdaptationSet element in the MPD, and further mapping the Representation elements enumerated in the AdaptationSet element on the Elementary Component.

That is, by using a relationship between the AdaptationSet element and the Representation element in the MPD, in the layer of the PickOneComponent at Level 3, one component is selected from the plurality of Elementary Components. In this case, the relationship between the AdaptationSet element and the Representation element is used, so a special extension is unnecessary. It should be noted that in the description in the subsequent figures, the AdaptationSet element is abbreviated as "AS", and the Representation element is abbreviated as "Rep".

(1-2) Function of the Layer at Level 2

Figure 9:
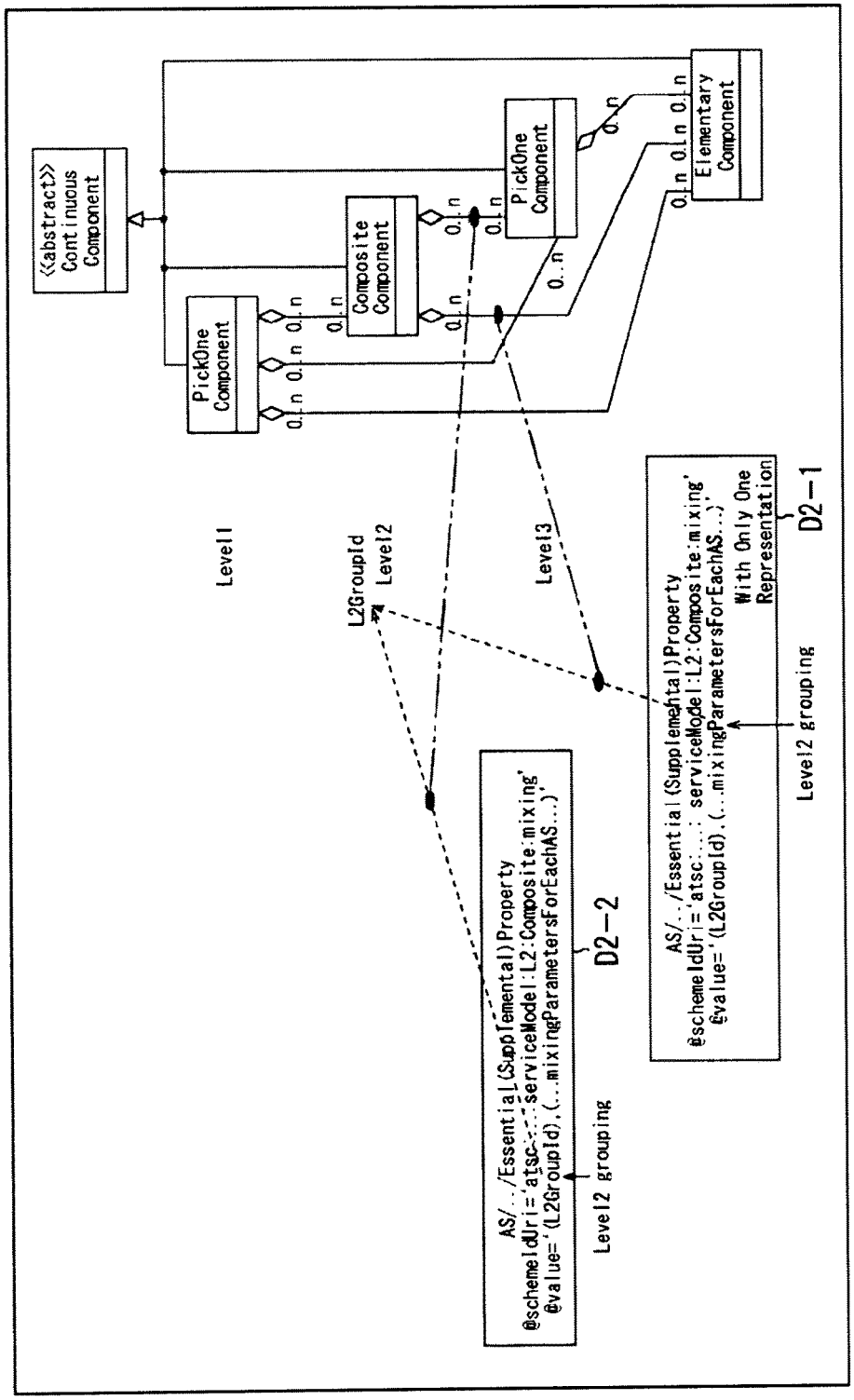
FIG. 9 A diagram showing a method of achieving a function of a layer at Level 2.

FIG. 9 is a diagram showing a method of achieving the function of the layer at Level 2 shown in FIG. 7. As shown in FIG. 9, the function of the layer at Level 2 can be achieved by defining a new element with the use of an EssentialProperty element (FIG. 5) or a SupplementalProperty element (FIG. 5) as lower elements of the AdaptationSet element prescribed in the MPD, and performing expansion in such a manner that grouping can be performed for target elements of the layer of the Composite Component.

Here, the case where the EssentialProperty element is used will be mainly described. The EssentialProperty element is constituted of a schemeIdUri attribute and a value attribute, the value of which is determined in conformity with a format specified by a value of the schemeIdUri attribute (URI: Uniform Resource Identifier). It should be noted that the value attribute is regarded as an optional attribute.

As shown in FIG. 9, the Elementary Component that is structured (for example, mixing) in the layer of the Composite Component at Level 2 can be represented as in a description example D2-1 in the MPD. In the description example D2-1, the EssentialProperty element is disposed in the AdaptationSet element, and the schemeIdUri attribute and the value attribute are further disposed.

Here, for example, as a namespace authority, "atsc" is defined, and a Uri attribute value of "atsc: . . . : serviceModel:L2:Composite:mixing" prescribed by the authority is defined. As a result, it is possible to make a definition so as to mean that the Elementary Component having the EssentialProperty element which has the Uri attribute value as the value of the schemeIdUri attribute is subjected to mixing in the layer of the Composite Component at Level 2 and outputted.

At this time, for the value attribute, a value ("L2GroupId") for identifying a group of components that is to be subjected to mixing in the layer of the Composite Component at Level 2 is specified. That is, with a group ID of Level 2, the grouping is performed in the layer of the Composite Component at Level 2. Further, for the value attribute, in addition to the group ID of Level 2, a mixing parameter value (" . . . mixingParametersForEachAS . . . ") or the like can be defined. For example, in the case where audio components are subjected to mixing, it is possible to define a relative audio volume to an overall audio volume after the mixing for the audio component. As the relative audio volume to the overall audio volume, a decimal value within the range of 0 to 1 is specified with the overall audio volume as 1, for example.

Further, as shown in FIG. 9, the component selected in the layer of the PickOneComponent at Level 3 which is subjected to structuring (for example, mixing) in the layer of the Composite Component at Level 2 can be represented as in a description example D2-2 of the MPD. In the description example D2-2, as in the description example D2-1 described above, the EssentialProperty element is disposed in the AdaptationSet element, and as the schemeIdUri attribute value, "atsc: . . . : serviceModel:L2:Composite:mixing" is specified. That is, this means that the components are subjected to mixing in the layer of the Composite Component at Level 2 and is outputted.

At this time, for the value attribute, "L2GroupId" is specified. That is, for the value attribute in the description example D2-2, a group ID ("L2GroupId") of Level 2, which is the same as the value attribute in the description example D2-1, is specified, and the component which is selected in the layer of the PickOneComponent at Level 3 and represented in the description example D2-2 belongs to the group at Level 2, which is the same as the Elementary Component represented in the description example D2-1.

As a result, in the layer of the Composite Component at Level 2, the component selected in the layer of the PickOneComponent at Level 3 and the Elementary Component are grouped, and the grouped components are subjected to structuring (for example, mixing) and outputted. In this way, the EssentialProperty element is expanded in such a manner that the target elements of the Composite Component at Level 2 can be grouped, with the result that the function of the layer at Level 2 is achieved.

(1-3) Function of the Layer at Level 1

Figure 10:
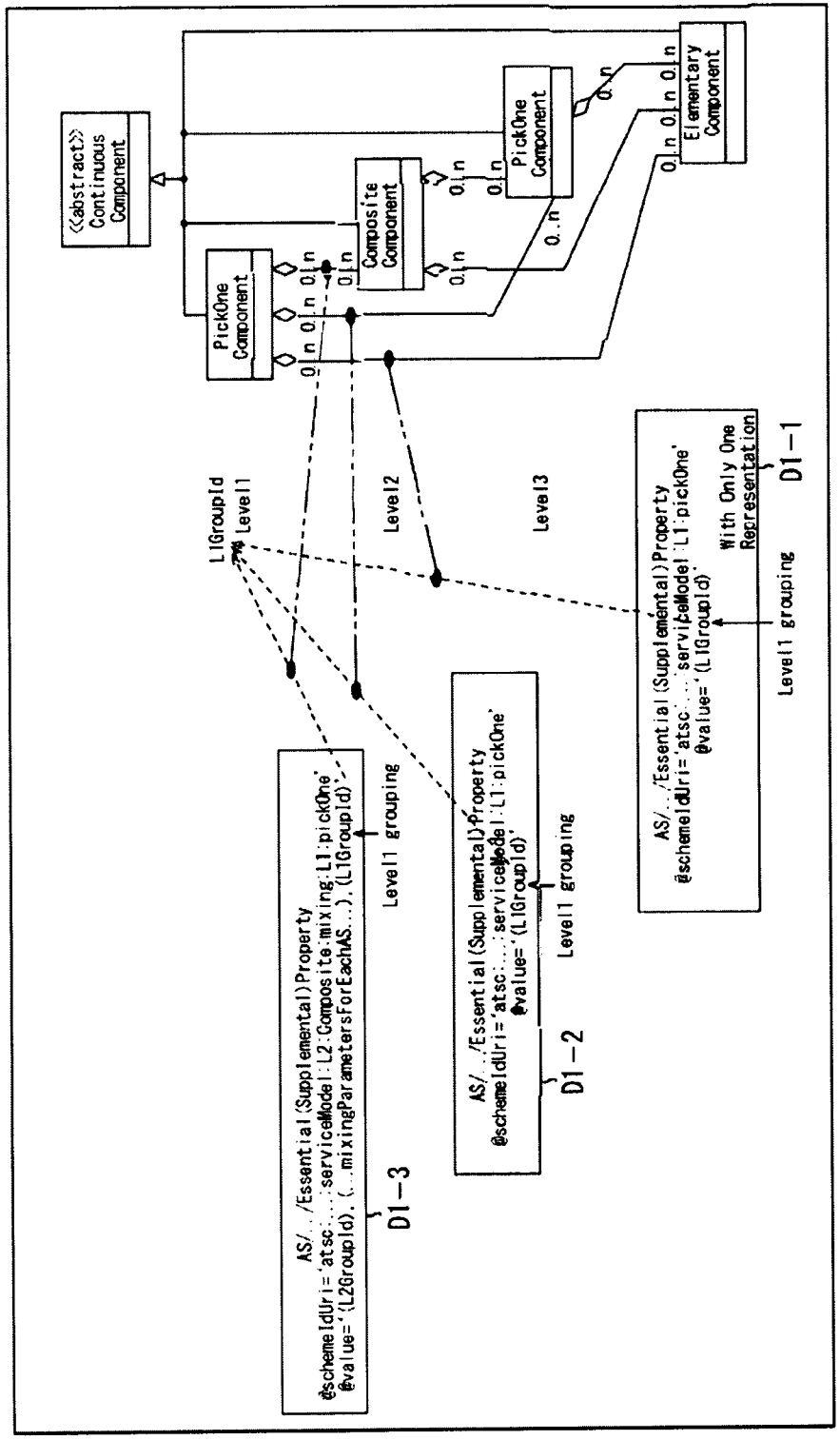
FIG. 10 A diagram showing a method of achieving a function of a layer at Level 1.

FIG. 10 is a diagram showing a method of achieving the function of the layer at Level 1 shown in FIG. 7. As shown in FIG. 10, the function of the layer at Level 1 can be achieved by defining a new element with the use of the EssentialProperty element (FIG. 5) or the SupplementalProperty element (FIG. 5) as lower elements of the AdaptationSet element prescribed in the MPD, and performing expansion in such a manner that grouping can be performed for target elements of the layer of the Composite Component. It should be noted that the case where the EssentialProperty element is used is mainly described here.

As shown in FIG. 10, the Elementary Component selected in the layer of the PickOneComponent at Level 1 can be represented as in a description example D1-1 of the MPD. In the description example D1-1, the EssentialProperty element is disposed in the AdaptationSet element, and the schemeIdUri attribute and the value attribute are further disposed.

Here, for example, in the case where "atsc" is defined as a namespace authority, a Uri attribute value of atsc: . . . :serviceModel:L1:pickOne" prescribed by the authority is defined. As a result, it is possible to define the Elementary Component having the EssentialProperty element which has the Uri attribute value as the value of the schemeIdUri attribute so as to mean to be selected in the layer of the PickOneComponent at Level 1 and outputted.

At this time, in the value attribute, a value ("L1GroupId") for identifying a group of a component to be selected in the layer of the PickOneComponent at Level 1 is specified. That is, with the group ID of Level 1, the grouping is performed in the layer of the PickOneComponent at Level 1.

Further, as shown in FIG. 10, the component selected in the layer of the PickOneComponent at Level 3, which is selected in the layer of the PickOneComponent at Level 1 can be represented as in a description example D1-2 of the MPD. In the description example D1-2, as in the description example D1-1 described above, the EssentialProperty element is disposed in the AdaptationSet element, and as the schemeIdUri attribute value thereof, "atsc: . . . :serviceModel:L1:pickOne" is specified. That is, this means that the component is selected in the layer of the PickOneComponent at Level 1 and is outputted. At this time, for the value attribute, "L1GroupId" is specified.

Further, as shown in FIG. 10, the components that have been subjected to structuring (for example, mixing) in the layer of the Composite Component at Level 2, which is selected in the layer of the PickOneComponent at Level 1, can be represented as in a description example D1-3 of the MPD. In the description example D1-3, as in the description examples D1-1 and D1-2, the EssentialProperty element is disposed in the AdaptationSet element, as the schemeIdUri attribute value, "atsc: . . . :serviceModel:L2:Composite: mixing:L1:pickOne" is specified. That is, this means that the components are subjected to mixing in the layer of the Composite Component at Level 2 and outputted, and are selected in the layer of the PickOneComponent at Level 1 and outputted.

At this time, for the value attribute, "L2GroupId", " . . . mixingParametersForEachAS . . . ", "L1GroupId" are specified. That is, this means that the component is subjected to mixing in the layer of the Composite Component at Level 2, and at the time of mixing, grouping is performed with the group ID ("L2GroupId") of Level 2. Further, here, it is possible to specify a mixing parameter such as a relative audio volume to an overall audio volume after the mixing, for example.

Further, for the value attribute in the description example D1-3, the group ID ("L1GroupId") of Level 1, which is the same as the value attribute in the description examples D1-1 and D1-2, is specified, and the component that is subjected to structuring in the layer of the Composite Component at Level 2, which is represented as in the description example D1-3, belongs to the group at Level 1, which is the same as the Elementary Component represented as in the description example D1-1 and the component selected in the layer of the PickOneComponent at Level 3.

As a result, in the layer of the PickOneComponent at Level 1, from among the component that has been subjected to structuring in the layer of the Composite Component at Level 2, the component selected in the layer of the PickOneComponent at Level 3, and the Elementary Components, one component is selected and output. In this way, the EssentialProperty element is expanded in such a manner that the target elements of the PickOneComponent at Level 1 can be grouped, with the result that the function of the layer at Level 1 is achieved.

Here, the methods of achieving the functions of each layer described above are compiled as shown in FIG. 11. That is, FIG. 11 shows the method of achieving the functions of layers at Levels in the first embodiment.

Figure 11:
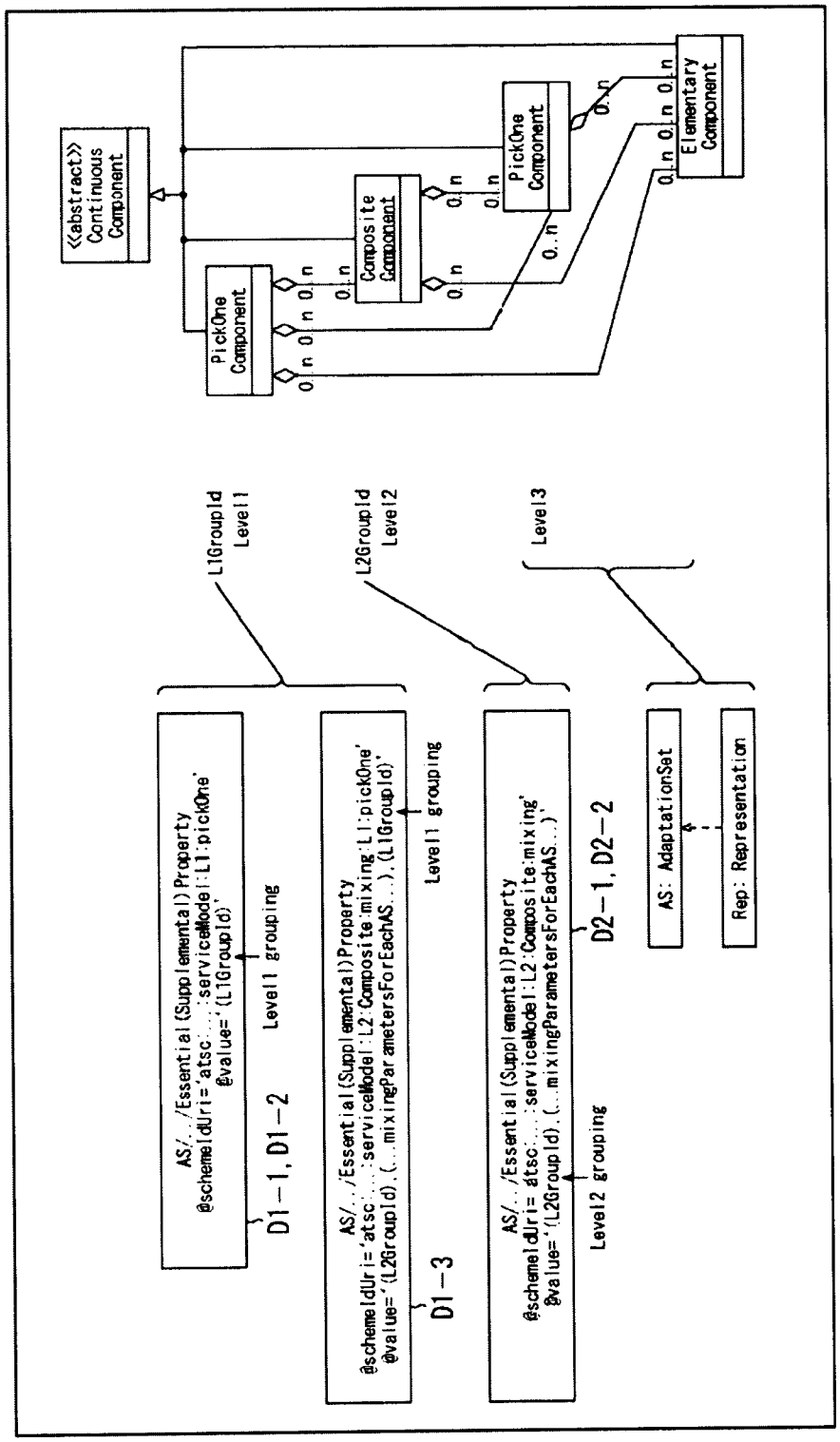
FIG. 11 A diagram showing a method of achieving functions of layers at Levels in a first embodiment.

As shown in FIG. 11, the function of the layer at Level 3 is achieved by using a relationship between the AdaptationSet element and the Representation element of the MPD. Therefore, in this case, a special expansion is not needed.

The function of the layer at Level 2 can be achieved by defining a new element with the use of an EssentialProperty element as a lower element of the AdaptationSet element prescribed in the MPD, and performing expansion so as to group the target elements in the layer of the Composite Component. In the description examples D2-1 and D2-2 of the MPD described above, in the layer of the Composite Component at Level 2, the component selected in the layer of the PickOneComponent at Level 3 and the Elementary Component are subjected to grouping with the same group ID ("L2GroupId") of Level 2, and the grouped components are subjected to structuring (for example, mixing) in the above example.

Like the function of the layer at Level 2, with the use of the EssentialProperty element, the function of the layer at Level 1 is achieved by defining a new element and expanding the target element in the layer of the PickOneComponent at Level 1. In the description examples D1-1, D1-2, and D1-3 of the MPD described above, in the layer of the PickOneComponent at Level 1, the component that has been subjected to structuring in the layer of the Composite Component at Level 2, the component selected in the layer of the PickOneComponent at Level 3, and the Elementary Component are subjected to grouping with the same group ID ("L1GroupId") of Level 1, and one component is selected from the grouped component group in the above example.

In this way, in the first embodiment, with the use of the MPD, the function of the third layer is achieved by using the relationship between the AdaptationSet element and the Representation element, the function of the second layer is achieved by performing grouping for the plurality of elements as the targets of structuring of the components with the EssentialProperty element, and the function of the first layer is achieved by performing grouping for the plurality of elements as the targets of selecting the components with the EssentialProperty element, with the result that the service requirement of the component layer structure shown in FIG. 7 is satisfied, and the broadcasting service can be provided by using the MPEG-DASH.

It should be noted that in the first embodiment, in the MPD, as the elements for grouping the target elements in the specific layer for performing selection or structuring of the components having the structure including the plurality of layers, the case where the EssentialProperty element is used is mainly described. However, in addition to this, another element or attribute, for example, SupplementalProperty element may be used.

(2) Specific Operation Examples

Subsequently, with reference to FIGS. 12 to 14, a specific operation example about the first embodiment will be described.

(2-1) Operation Example 1

Figure 12:
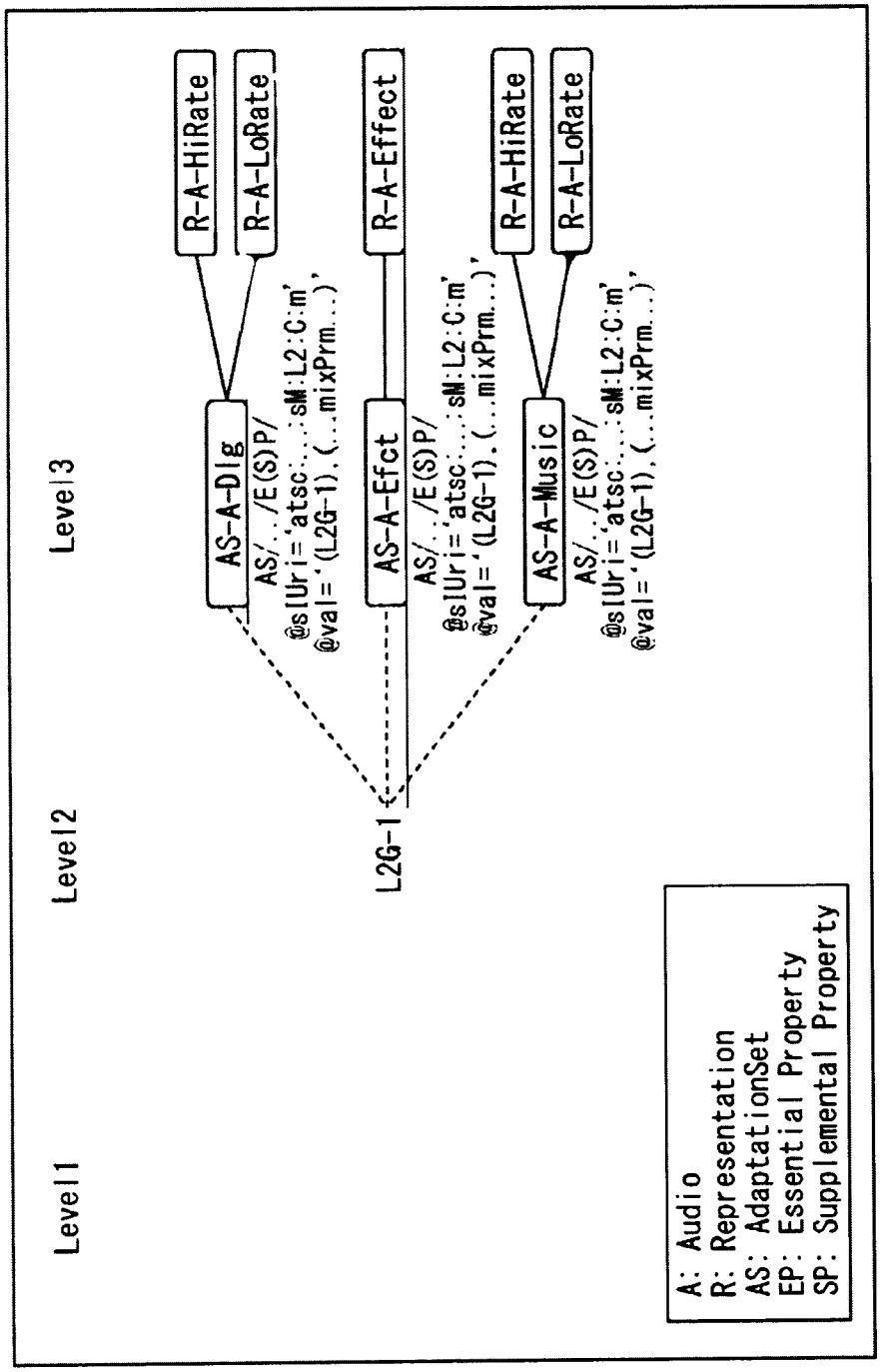
FIG. 12 A diagram for explaining an operation example 1.

FIG. 12 is a diagram for explaining an operation example 1 in which mixing reproduction of an audio stream is performed. In FIG. 12, a description content of the MPD for achieving the operation example 1 is shown, and "AS" represents the AdaptationSet element, and "R" represents the Representation element. Further, "A" in the AdaptationSet element and the Representation element represents an audio component. Furthermore, in the figure, "EP" means an EssentialProperty element, and "@" means an attribute. Therefore, "@sIUri" and "@val" represents a schemeIdUri attribute and a value attribute of the EssentialProperty element, respectively. It should be noted that "SP" represents the SupplementalProperty element, but the case where the EssentialProperty element is used will be mainly described here. Further, the relationship of the abbreviations is also used in the subsequent figures in the similar way.

Here, in the operation example 1 shown in FIG. 12, as an attribute value of the schemeIdUri attribute of the EssentialProperty element in the AdaptationSet element, "atsc: . . . :sM:L2:C:m" (abbreviation of "atsc: . . . :serviceModel:L2:Composite:mixing") is defined, and this means that an AdaptationSet attribute group of the audio component having the EssentialProperty element having this attribute value is subjected to mixing and is outputted. Further, for the value attribute of the EssentialProperty element, it is defined that the value means a group ID ("L2GroupId") of an audio component group in which the audio component is to be subjected to mixing and an arbitrary mixing parameter value.

In FIG. 12, three AdaptationSet elements corresponding to a single audio stream are described, and under the AdaptationSet elements, one or more Representation elements are described.

Under the first AdaptationSet element from the top in the figure, two Representation elements are described, and as the audio components having different bit rates, Dialogs (Dlg) at a high bit rate and a low bit rate are enumerated. In a layer at Level 3 (PickOneComponent), for example, in accordance with a network environment condition or the like, one audio component is adaptively selected.

It should be noted that in the first AdaptationSet element, as the schemeIdUri attribute of the EssentialProperty element, "atsc: . . . :sM:L2:C:m" is specified, and as the value attribute, "L2G-1" is specified. That is, the components selected in the layer at Level 3 belong to a mixing group 1 for which the group ID ("L2GroupId") of Level 2 as "1" is specified.

Under the second AdaptationSet element from the top in the figure, only one Representation element is described, and as the audio component, an Effect (Efct) is enumerated, one audio component is selected at all times. The audio component selected in this way corresponds to the Elementary Component.

It should be noted that in the second AdaptationSet element, as the schemeIdUri attribute of the EssentialProperty element, "atsc: . . . :sM:L2:C:m" is specified, and as the value attribute, "L2G-1" is specified. That is, the component corresponding to the Elementary Component belongs to the mixing group 1 for which the group ID ("L2GroupId") of Level 2 as is specified.

Under the third AdaptationSet element in the figure, two Representation elements are described, and as audio components having different bit rates, music at a high bit rate and a low bit rate is enumerated. In the layer at Level 3 (PickOneComponent), for example, in accordance with a network environment condition or the like, one audio component is adaptively selected.

It should be noted that in the third AdaptationSet element, as the schemeIdUri attribute of the EssentialProperty element, "atsc: . . . :sM:L2:C:m" is specified, and as the value attribute, "L2G-1" is specified. That is, the component selected in the layer at Level 3 belongs to the mixing group 1 for which the group ID ("L2GroupId") of Level 2 as "1" is specified.

As described above, the PickOneComponent at Level 3 is mapped on the AdaptationSet element, and further, the Representation elements enumerated in the AdaptationSet element are mapped on the Elementary Component, with the result that the function of the layer at Level 3 in the component layer structure is achieved, and the audio component selection is performed.

For the three AdaptationSet elements, as the schemeIdUri attribute of the EssentialProperty element, "atsc: . . . :sM: L2:C:m" is specified, and as the value attribute, "L2G-1" is specified. Therefore, the elements belong to the same mixing group 1. In this way, with the schemeIdUri attribute and the value attribute of the EssentialProperty element, grouping is performed for the plurality of AdaptationSet elements, with the result that the function of the layer at Level 2 in the component layer structure shown in FIG. 7 is achieved, and in the layer of the Level 2 (Composite Component), mixing for the audio components is performed.

As described above, in the operation example 1 shown in FIG. 12, the function of the layer at Level 3 in the component layer structure shown in FIG. 7 is achieved by mapping the PickOneComponent on the AdaptationSet element and further mapping the Representation elements enumerated in the AdaptationSet element on the Elementary Component. Further, the function of the layer at Level 2 is achieved by grouping the target elements in the layer of the Composite Component at Level 2 with the schemeIdUri attribute and the value attribute of the EssentialProperty element disposed in the AdaptationSet element. In this way, the layer at Level 2 and the function of the layer at Level 3 are achieved, thereby performing mixing reproduction for the audio stream.

(2-2) Operation Example 2

Figure 13:
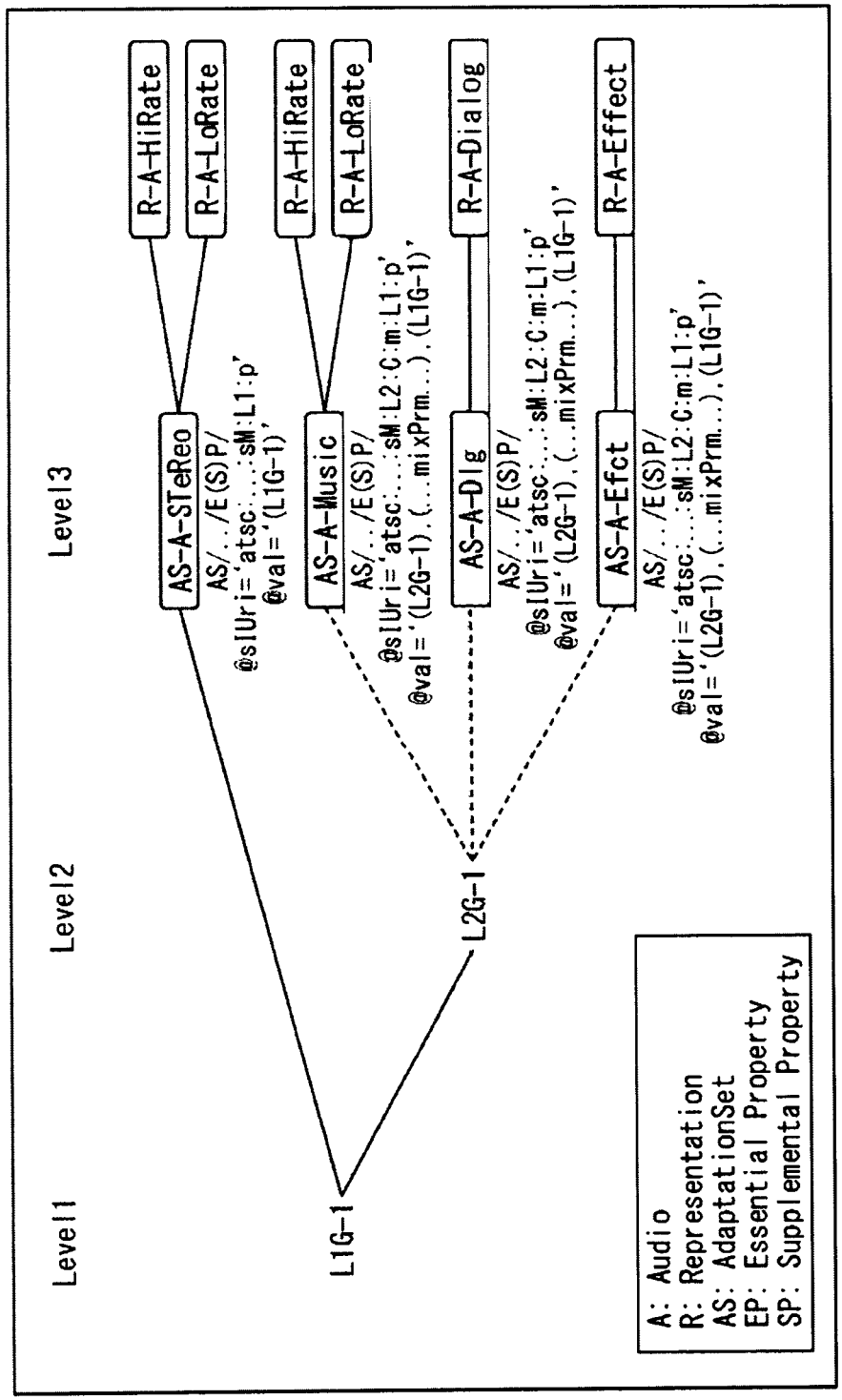
FIG. 13 A diagram for explaining an operation example 2.

FIG. 13 is a diagram for explaining an operation example 2 for performing an audio stream group selection.

FIG. 13 shows a description content of the MPD for achieving the operation example 2, and as in FIG. 12, "AS" and represent the AdaptationSet element and the Representation element, respectively. Further, as in FIG. 12, "@sIUri" and "@val" represent the schemeIdUri attribute and the value attribute of the EssentialProperty element.

Further, in the operation example 2 shown in FIG. 13, as the attribute value of the schemeIdUri attribute of the EssentialProperty element in the AdaptationSet element, "atsc: . . . :sM:L1:p" (abbreviation of "atsc: . . . :serviceModel:L1:pickOne") is defined, and this means that the audio component having the EssentialProperty element having the attribute value is selected in the layer of the PickOneComponent at Level 1 and is outputted.

Further, as the attribute value of the schemeIdUri attribute of the EssentialProperty element, "atsc: . . . :sM:L2:C=L1:p" (abbreviation of "atsc: . . . :serviceModel:L2:Composite: mixing:L1:pickOne") is defined, and this means that the audio component having the EssentialProperty element having the attribute value is subjected to mixing in the layer of the Composite Component at Level 2 and outputted, and is selected in the layer of the PickOneComponent at Level 1 and outputted.

Further, for the value attribute of the EssentialProperty element, it is defined that the value means the group ID ("L2GroupId") of the audio component group in which the audio component is to be subjected to mixing, the group ID ("L1GroupId") of the component to be selected in the layer of the PickOneComponent at Level 1, and an arbitrary mixing parameter value.

In FIG. 13, four AdaptationSet elements corresponding to a single audio stream are described, and under the AdaptationSet elements, one or more Representation elements are described.

Under the first AdaptationSet element from the top in the figure, two Representation elements are described, and as audio components having different bit rates, Stereos (STR) at a high bit rate and a low bit rate are enumerated. In the layer at Level 3 (PickOneComponent), for example, in accordance with a network environment condition or the like, one audio component is adaptively selected.

It should be noted that in the first AdaptationSet element, as the schemeIdUri attribute of the EssentialProperty element, "atsc: . . . :sM:L1:p" is specified, and as the value attribute, "L1G-1" is specified. That is, the component selected in the layer at Level 3 belongs to a selective group 1 for which the group ID ("L1GroupId") of Level 1 as "1" is specified.

Under the second AdaptationSet element from the top in the figure, two Representation elements are described, and as audio components having different bit rates, Music at a high bit rate and a low bit rate is enumerated. In the layer at Level 3 (PickOneComponent), for example, in accordance with a network environment condition or the like, one audio component is adaptively selected.

It should be noted that for the second AdaptationSet element, as the schemeIdUri attribute of the EssentialProperty element, "atsc: . . . :sM:L2:C=L1:p" is specified, and as the value attributes, "L1G-1" and "L2G-1" are specified. That is, the component selected in the layer at Level 3 belongs to the mixing group 1 for which the group ID ("L2GroupId") of Level 2 as is specified, and also belongs to the selective group 1 for which the group ID ("L1GroupId") of Level 1 as "1" is specified.

Under the third AdaptationSet elements from the top in the figure, only one Representation element is described, and as the audio component, Dialog (Dlg) is enumerated. One audio component is selected at all times. The audio component selected in this way corresponds to the Elementary Component.

It should be noted that for the third AdaptationSet element, as the schemeIdUri attribute of the EssentialProperty element, "atsc: . . . :sM:L2:C=L1:p" is specified, and as the value attributes, "L1G-1" and "L2G-1" are specified. That is, the component belongs to the mixing group 1 for which the group ID ("L2GroupId") of Level 2 as "1" is specified, and also belongs to the selective group 1 for which the group ID ("L1GroupId") of Level 1 as "1" is specified.

Under the fourth AdaptationSet element from the top in the figure, only one Representation element is described, and as the audio component, Effect (Efct) is enumerated. One audio component is selected at all times. The audio component selected in this way corresponds to the Elementary Component.

It should be noted that for the fourth AdaptationSet element, as the schemeIdUri attribute of the EssentialProperty element, "atsc: . . . :sM:L2:C=L1:p" is specified, and as the value attributes, "L1G-1" and "L2G-1" are specified. That is, the component belongs to the mixing group 1 for which the group ID ("L2GroupId") of Level 2 as "1" is specified, and also belongs to the selective group 1 for which the group ID ("L1GroupId") of Level 1 as "1" is specified.

In this way, the PickOneComponent of the Level 3 is mapped on the AdaptationSet elements, and further the Representation elements enumerated in the AdaptationSet elements are mapped on the Elementary Component, with the result that the function of the layer at Level 3 in the component layer structure shown in FIG. 7 is achieved, and the audio component is selected.

Further, out of the four AdaptationSet elements, for the second and fourth AdaptationSet elements, as the schemeIdUri attribute of the EssentialProperty element, "atsc: . . . :sM:L2:C=L1:p" is specified, and as the value attributes, "L1G-1" and "L2G-1" are specified, so those belong to the same mixing group 1. In this way, with the schemeIdUri attribute and the value attributes of the EssentialProperty element, grouping is performed for the plurality of AdaptationSet elements. As a result, the function of the layer at Level 2 in the component layer structure is achieved, and in the layer at Level 2 (Composite Component), mixing is performed for the audio component.

Further, for the first AdaptationSet element, "atsc: . . . :sM:L1:p" is specified, and as the value attribute, "L1G-1" is specified, so the four AdaptationSet elements belong to the same selective group 1. In this way, with the schemeIdUri attributes and the value attributes of the AdaptationSet elements, grouping is performed for the plurality of AdaptationSet elements, with the result that the function of the layer at Level 1 of the component layer structure shown in FIG. 7 is achieved, and in the layer at Level 1 (PickOneComponent), from the audio components in the same group, one audio component is selected.

In this case, either one of the audio component (Stereo) selected in the layer at Level 3 (PickOneComponent) and the audio component (Music, Dialog, Effect) that has been subjected to mixing in the layer at Level 2 (Composite Component) which belong to selective group 1 is selected.

As described above, in the operation example 2 shown in FIG. 13, the function of the layer at Level 3 in the component layer structure shown in FIG. 7 is achieved by mapping the PickOneComponent on the AdaptationSet element and further mapping the Representation element enumerated in the AdaptationSet element on the Elementary Component. Further, the function of the layer at Level 2 is achieved by grouping the target elements in the layer of the Composite Component at Level 2 with the schemeIdUri attribute and the value attribute of the EssentialProperty element disposed in the AdaptationSet element. Furthermore, the function of the layer at Level 1 is achieved by grouping the target elements in the layer of the PickOneComponent at Level 1 with the schemeIdUri attribute and the value attribute of the EssentialProperty element disposed in the AdaptationSet element. As described above, the functions of the layers at Level 1, Level 2, and level 3 are achieved, thereby performing the group selection of the audio components, and the audio components are reproduced.

(2-3) Operation Example 3

Figure 14:
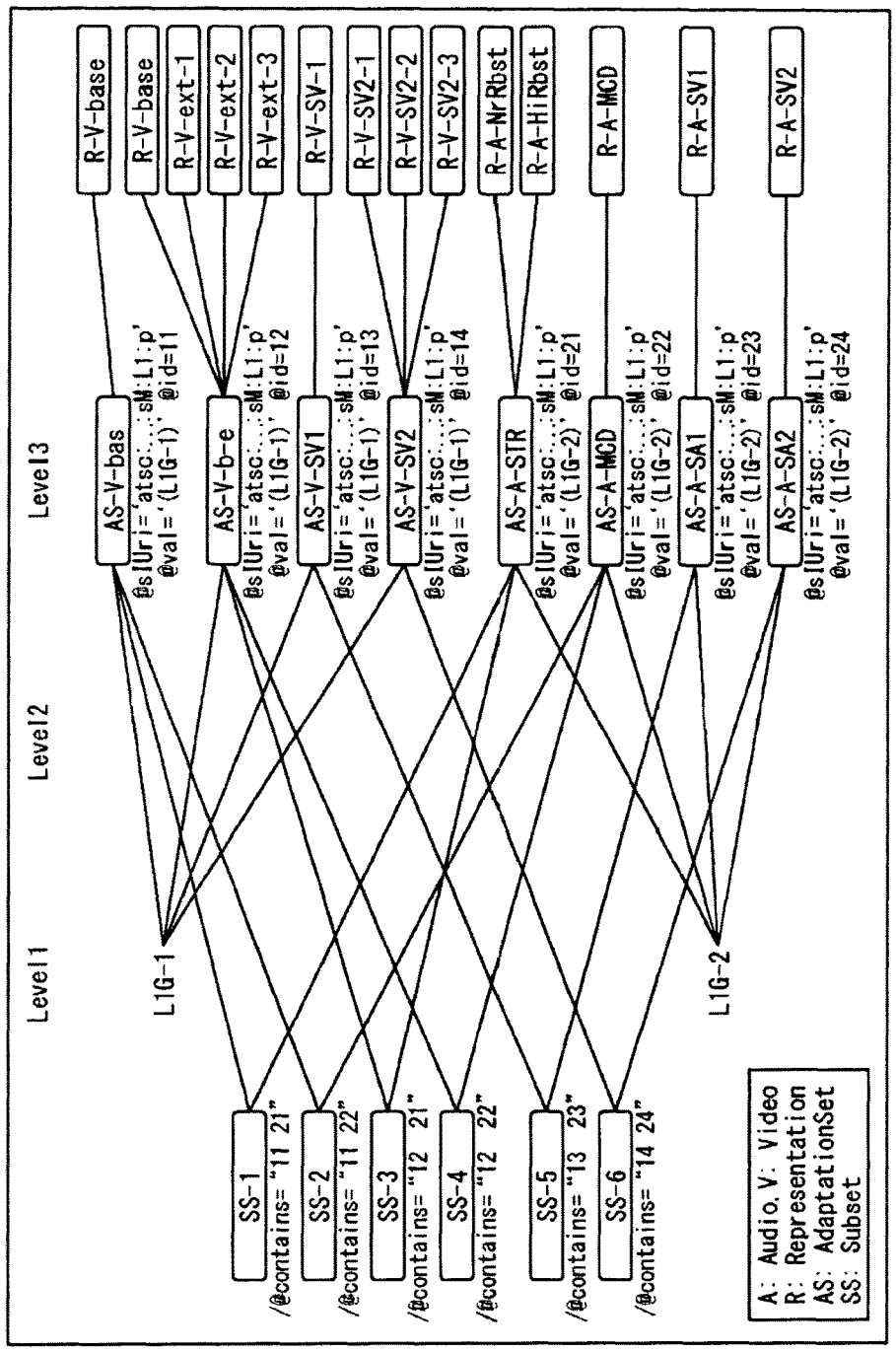
FIG. 14 A diagram for explaining an operation example 3.

FIG. 14 is a diagram for explaining an operation example 3 for performing grouping for simultaneous presentation of components. FIG. 14 shows a description content of the MPD for achieving the operation example 3, and "AS" and "R" represent the AdaptationSet element and the Representation element, respectively. Further, "A" and "V" of the AdaptationSet element and the Representation element represent an audio component and a video component, respectively. Further, "@sIUri" and "@val" represent the schemeIdUri attribute and the value attribute of the EssentialProperty element. Further, in the AdaptationSet element, an id attribute indicated by "@id" is described.

Further, "SS" represents a Subset element. To specify a set of the AdaptationSet elements with the Subset element, in a contains attribute of the Subset element, an id attribute value of the AdaptationSet element is stored as a list. Here, the Subset element is used to define grouping for simultaneous presentation of a plurality of components such as video and audio components outside of regulations relating to the component layer structure.

In the operation example 3 shown in FIG. 14, as the attribute value of the schemeIdUri attribute of the EssentialProperty element in the AdaptationSet element, "atsc: . . . :sM:L1:p" (abbreviation of "atsc: . . . :serviceModel:L1:pickOne") is defined, and this means that a video component having the EssentialProperty element having the attribute value is selected in the layer of the PickOneComponent at Level 1 and outputted. Further, for the value attribute of the EssentialProperty element, it is defined that the value means the group ID ("L1GroupId") of a component that is to be selected in the layer of the PickOneComponent at Level 1.

That is, in the MPD shown in FIG. 14, four AdaptationSet elements (id="11", "12", "13", "14") that belong to a video selective group 1 and four AdaptationSet elements (id="21", "22", "23", "24") that belong to an audio selective group 2 are described. Under the AdaptationSet elements, one or more Representation elements are described, respectively.

In the video selective group 1 (L1G-1), in each of the Representation elements, as the video component, "base", "ext", "SV1", and "SV2" are enumerated. Here, "base" represents a video component corresponding to a basic video signal that can be reproduced alone, and "ext" represents a video component corresponding to a video signal for expansion. Further, in "SV1" and "SV2", "SV" represents a sub view as an auxiliary area with respect to a main view as a main display area.

Under the AdaptationSet element of id="11", only one Representation element ("V-base") is described, one video component corresponding to the basic video signal that can be reproduced alone is selected at all times. The video component selected in this way corresponds to the Elementary Component. It should be noted that the video component is for the main view.

Under the AdaptationSet element of id="12", four Representation elements ("V-base", "V-ext-1", "V-ext-2", "V-ext-3") are described, and the Representation element groups have dependence of a Base-Enhance relationship. That is, under the AdaptationSet element of id='12', one video component corresponding to a basic video signal is enumerated, and three video components corresponding to expansion video signals are enumerated. Those have dependence of a Base-Enhance relationship. As a result, in the layer at Level 3 (PickOneComponent), depending on a network environment condition or the like, for example, the video components corresponding to the basic video signal and the expansion video signal are selected. It should be noted that the video components are for the main view.

Under the AdaptationSet element of id="13", only one Representation element ("V-SV-1") is described, and one video component for a sub view 1 is selected at all times. The video component selected in this way corresponds to the Elementary Component.

Under the AdaptationSet element of id="14", three Representation elements ("V-SV2-1", "V-SV2-2", "V-SV2-3") are described, and three video components for a sub view 2 are enumerated. In the layer at Level 3 (PickOneComponent), for example, in accordance with a network environment condition or the like, one video component is adaptively selected.

In this way, by mapping the PickOneComponent at Level 3 on the AdaptationSet elements, and further mapping the Representation elements enumerated in the AdaptationSet elements on the Elementary Component, the function of the layer at Level 3 in the component layer structure shown in FIG. 7 is achieved, and the video component selection is performed.

Here, in the MPD shown in FIG. 14, for the AdaptationSet element of id="11", the AdaptationSet element of id="12", the AdaptationSet element of id="13", and the AdaptationSet element of id="14", as the schemeIdUri attribute of the EssentialProperty element, "atsc: . . . :sM:L1:p" is specified, and as the value attribute, "L1G-1" is specified. That is, the video component selected in the layer at Level 3 belongs to the selective group 1 for which the group ID ("L1GroupId") of Level 1 as "1" is specified.

In this way, with the schemeIdUri attribute and the value attribute of the EssentialProperty element in the AdaptationSet element, grouping is performed, with the result that the function of the layer at Level 1 of the component layer structure shown in FIG. 7 is achieved, and in the layer at Level (PickOneComponent), one video component is selected from the video components in the same group. Here, from among the video components ("V-base", "V-ext-1", "V-ext-2" or "V-ext-3", and "V-SV2-1", "V-SV2-2" or "V-SV2-3") that belong to the selective group 1 and is selected in the layer at Level 3 (PickOneComponent), and the Elementary Components ("V-base", "V-SV-1"), one video component is selected.

On the other hand, in an audio selective group 2 (L1G-2), in the Representation elements, as the audio components, "NrRbst", "HiRbst", "MCD", "SV1", and "SV2" are enumerated. "NrRbst" means an audio component having a normal robustness. Further, "HiRbst" means an audio component having a high robustness. "MCD" represents a multi-channel audio component. Further, in "SV1" and "SV2", "SV" represents an audio component for the ub view.

Under the AdaptationSet element of id="21", two Representation elements ("A-NrRbst", "A-HiRbst") are described, the audio component having the normal robustness and audio component having the high robustness are enumerated. In the layer at Level 3 (PickOneComponent), for example, in accordance with a network environment condition or the like, one audio component is adaptively selected. It should be noted that the audio component is for the main view.

Under the AdaptationSet element of id="22", only one Representation element ("A-MCD") is described, and one multi-channel audio component is selected at all times. The audio component selected in this way corresponds to the Elementary Component. It should be noted that the audio component is for the main view.

Under the AdaptationSet element of id="23", only one Representation element ("A-SV1") is described, and one audio component for the sub view 1 is selected at all times. In a similar way, under the AdaptationSet element of id="24", only one Representation element ("A-SV2") is described, and one audio component for the sub view 2 is selected at all times. The audio components for the sub views selected as described above correspond to the Elementary Components.

Here, in the MPD shown in FIG. 14, for the AdaptationSet element of id="21", the AdaptationSet element of id="22", the AdaptationSet element of id="23", and the AdaptationSet element of id="24", as the schemeIdUri attribute of the EssentialProperty element, "atsc: . . . :sM:L1:p" is specified, and as the value attribute, "L1G-2" is specified. That is, the audio components selected in the layer at Level 3 belong to the selective group 2 for which the group ID ("L1GroupId") of Level 1 as "2" is specified.

In this way, with the schemeIdUri attribute and the value attribute of the EssentialProperty element in the AdaptationSet element, grouping is performed, with the result that the function of the layer at Level 1 in the component layer structure shown in FIG. 7 is achieved, and in the layer at Level (PickOneComponent), from among the audio components in the same group, one audio component is selected. Here, from the audio component ("A-NrRbst" or "A-HiRbst") that is selected in the layer at Level 3 (PickOneComponent) and belongs to the selective group 2 and the Elementary Components ("A-MCD", "A-SV1", "A-SV2"), one audio component is selected.

Further, in the MPD shown in FIG. 14, the Subset element is used to define grouping for simultaneous presentation of the plurality of components such as the video and audio components outside of regulations relating to the component layer structure.

Specifically, for the contains attribute of the first Subset element from the top in the figure, "11 21" is specified, and this indicates that the AdaptationSet element of id="11" and the AdaptationSet element of id="21" are a set of the AdaptationSet elements simultaneously presented. That is, the video component ("V-base") and the audio component ("A-NrRbst" or "A-HiRbst") are components for the main view to be simultaneously reproduced.

For a contains attribute of the second Subset element from the top in the figure, "11 22" is specified, and this indicates that the AdaptationSet element of id="11" and the AdaptationSet element of id="22" are a set of the AdaptationSet elements to be simultaneously presented. That is, the video component ("V-base") and the audio component ("A-MCD") are components for the main view to be simultaneously reproduced.

For a contains attribute of the third Subset element from the top in the figure, "12 21" is specified, and this indicates that the AdaptationSet element of id="12" and the AdaptationSet element of id="21" are a set of the AdaptationSet elements to be simultaneously presented. That is, the video components ("V-base" and "V-ext") and the audio component ("A-NrRbst" or "A-HiRbst") are components for the main view to be simultaneously reproduced.

For a contains attribute of the fourth Subset element from the top in the figure, "12 22" is specified, and this indicates that the AdaptationSet element of id="12" and the AdaptationSet element of id="22" are a set of the AdaptationSet elements to be simultaneously presented. That is, the video components ("V-base" and "V-ext") and the audio component ("A-MCD") are components for the main view to be simultaneously reproduced.

For a contains attribute of the fifth Subset element from the top in the figure, "13 23" is specified, and this indicates that the AdaptationSet element of id="13" and the AdaptationSet element of id="23" are a set of the AdaptationSet elements to be simultaneously presented. That is, the video component ("V-SV1") and the audio component ("A-SV1") are components for the sub view 1 to be simultaneously reproduced.

For a contains attribute of the sixth Subset element from the top in the figure, "14 24" is specified, and this indicates that the AdaptationSet element of id="14" and the AdaptationSet element of id="24" are a set of the AdaptationSet elements to be simultaneously presented. That is, the video component ("V-SV2") and the audio component ("A-SV2") are components for the sub view 2 to be simultaneously reproduced.

As described above, in the operation example 3 shown in FIG. 14, the Subset elements are used to define grouping for the simultaneous presentation of the plurality of components such as the video and audio components outside of regulations relating to the component layer structure shown in FIG. 7, with the result that between the video and audio components, associating for the main view, for the sub view 1, for the sub view 2, or the like can be performed, for example. It should be noted that the associating is performed as described above, so one of the video and audio components is specified, the other component can be specified, for example.

4. Second Embodiment (1) Method of Achieving Functions of Layers at Levels

In a second embodiment, as in the first embodiment described above, in the case where the MPEG-DASH is used to provide the broadcasting service, elements already defined in the standard specification of the MPD are used in order to satisfy the service requirement of the component layer structure shown in FIG. 7. Hereinafter, a method of achieving functions of layers at Levels in the second embodiment will be described in detail.

(1-1) Function of the Layer at Level 3

Figure 15:
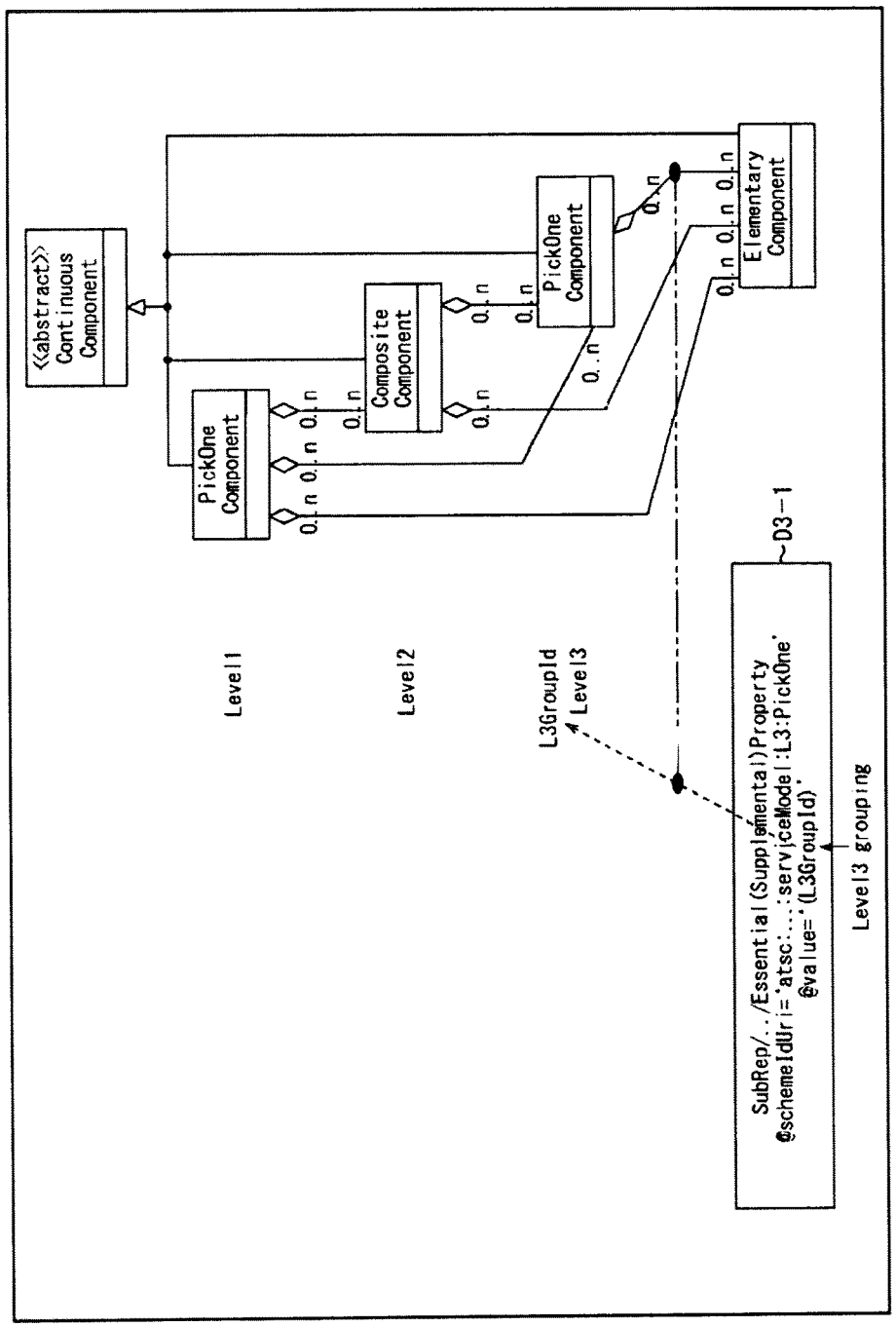
FIG. 15 A diagram showing a method of achieving the function of the layer at Level 3.

FIG. 15 is a diagram showing a method of achieving the function of the layer at Level 3 shown in FIG. 7. As shown in FIG. 15, the function of the layer at Level 3 can be achieved by defining a new element with the use of the EssentialProperty element (FIG. 6) or the SupplementalProperty element (FIG. 6) as lower elements of SubRepresentation elements prescribed in the MPD, and performing expansion so as to group target elements of the PickOneComponent at Level 3. It should be noted that in description of the subsequent figures, the SubRepresentation element is abbreviated as "SubRep".

Here, the case where the EssentialProperty element is used is mainly described. As described above, the EssentialProperty element is formed of the schemeIdUri attribute and a value attribute, the value of which is determined in conformity with a format specified by the schemeIdUri attribute value.

As shown in FIG. 15, the Elementary Component selected in the layer of the PickOneComponent at Level 3 can be represented as in a description example D3-1 of the MPD. In the description example D3-1, in the SubRepresentation element, the EssentialProperty element is disposed, and the schemeIdUri attribute and the value attribute are further disposed.

Here, for example, as a namespace authority, "atsc" is defined, and a Uri attribute value as "atsc: . . . :serviceModel: L3: PickOne" is defined. As a result, it is possible to define the Elementary Component that has the EssentialProperty element having the Uri attribute value as the schemeIdUri attribute value so as to mean to be selected in the layer of the PickOneComponent at Level 3 and outputted.

At this time, for the value attribute, a value ("L3GroupId") for identifying the group of a component group to be selected in the layer of the PickOneComponent at Level 3 is specified. That is, with the group ID of Level 3, grouping is performed for the layer of the PickOneComponent at Level 3.

As a result, in the layer of the PickOneComponent at Level 3, grouping is performed for a plurality of Elementary Components, and from among the plurality of Elementary Components that has been grouped, one component is selected. In this way, the EssentialProperty element is expanded so as to group the target elements of the PickOneComponent at Level 3, thereby achieving the function of the layer at Level 3.

(1-2) Function of the Layer at Level 2

Figure 16:
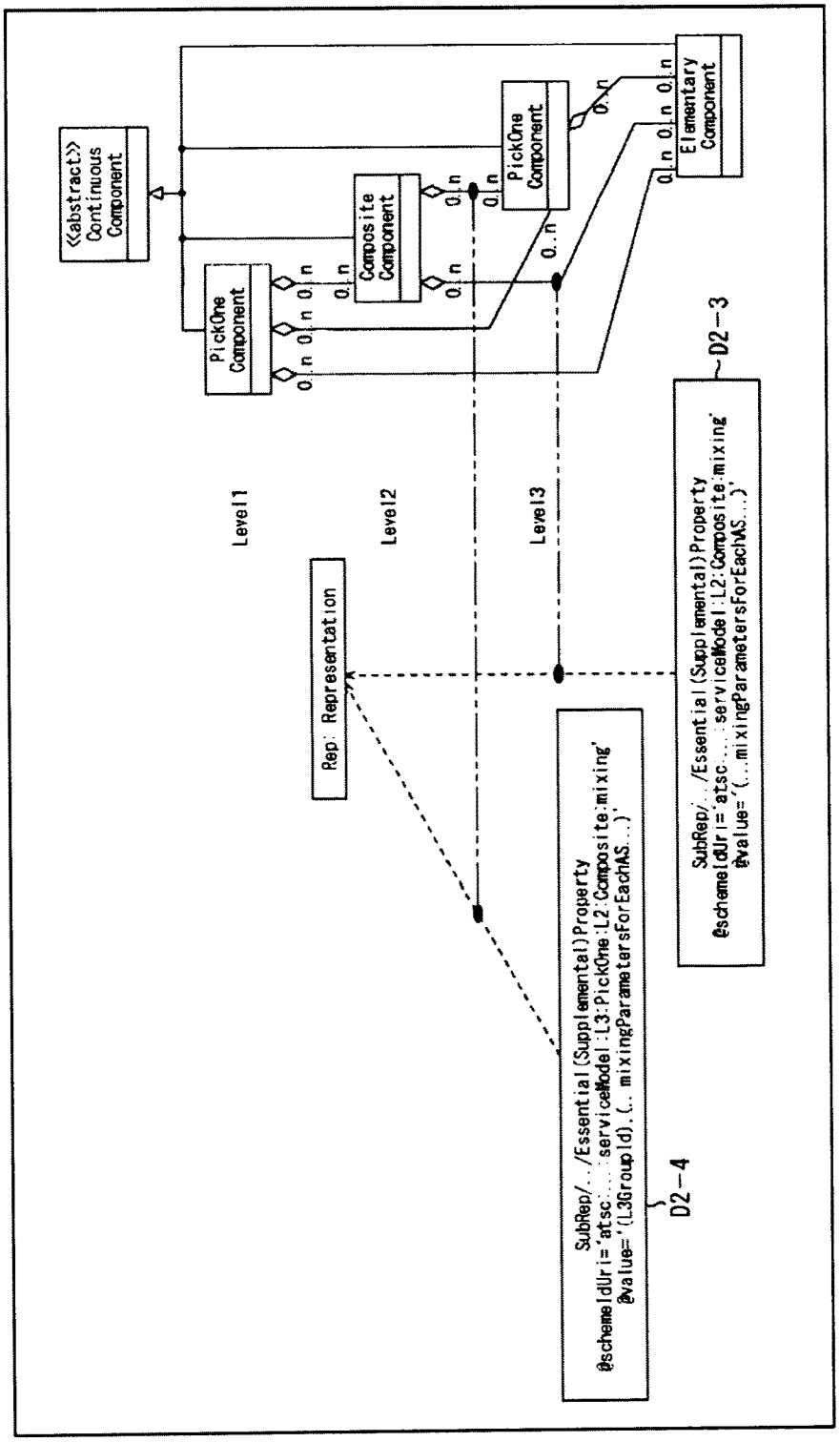
FIG. 16 A diagram showing a method of achieving the function of the layer at Level 2.

FIG. 16 is a diagram showing a method of achieving the function of the layer at Level 2 shown in FIG. 7. As shown in FIG. 16, the function of the layer at Level 2 can be achieved by defining a new element with the use of the EssentialProperty element (FIG. 6) or the SupplementalProperty element (FIG. 6) as lower elements of SubRepresentation elements prescribed in the MPD, and expanding target elements of the Composite Component at Level 2 so as to be grouped.

As shown in FIG. 16, the Elementary Component that is subjected to structuring (for example, mixing) in the layer of the Composite Component at Level 2 can be represented as in a description example D2-3 in the MPD. In the description example D2-3, in the SubRepresentation element, the EssentialProperty element is disposed, and the schemeIdUri attribute and the value attribute are further disposed.

Here, for example, as the namespace authority, "atsc" is defined, and the Uri attribute value as "atsc: . . . : serviceModel:L2:Composite:mixing" prescribed by the authority is defined. As a result, it is possible to define the Elementary Component having the EssentialProperty element having the Uri attribute value as the schemeIdUri attribute value so as to mean to be subjected to mixing in the layer of the Composite Component at Level 2 and outputted.

At this time, for the value attribute, a value of a mixing parameter (" . . . mixingParametersForEachAS . . . ") or the like can be defined. However, in the second embodiment, a group ID of Level 2 does not have to be defined. That is, SubRepresentation elements are disposed under the Representation element, so a plurality of SubRepresentation elements enumerated under the same Representation element is brought together, namely, grouped by the Representation element, so it is unnecessary to specify the group ID of Level 2.

Further, as shown in FIG. 16, the component selected in the layer of the PickOneComponent at Level 3 which is subjected to structuring (for example, mixing) in the layer of the Composite Component at Level 2 can be represented as in a description example D2-4 of the MPD. In the description example D2-4, as in the description example D2-3 described above, in the SubRepresentation element, the EssentialProperty element is disposed, and as the schemeIdUri attribute, "atsc: . . . :serviceModel:L3:pickOne:L2: Composite:mixing" is specified. That is, this means that the component is selected in the layer of the PickOneComponent at Level 3 and outputted, and is subjected to mixing in the layer of the Composite Component at Level 2 and outputted.

At this time, for the value attribute, "L3GroupId" and " . . . mixingParametersForEachAS . . . " are specified. That is, this means that the component is selected in the layer of the PickOneComponent at Level 3, and is grouped by the group ID ("L3GroupId") of Level 3 at the time of selection. Further, here, it is possible to specify a mixing parameter such as a relative audio volume to an overall audio volume after the mixing in the layer of the Composite Component at Level 2, but in the description example D2-4, it is also unnecessary to define the group ID of Level 2 for the similar reason as in the description example D2-3 described above.

The SubRepresentation element in which the Elementary Components are enumerated and the SubRepresentation element in which the component selected in the layer of the PickOneComponent at Level 3 are disposed under the same Representation element. Therefore, by the Representation element, the components enumerated in the SubRepresentation elements are grouped, structuring (for example, mixing) is performed for the grouped components, and the components are outputted. In this way, the EssentialProperty element is expanded in such a manner that the target elements of the Composite Component at Level 2 can be grouped, with the result that the function of the layer at Level 2 is achieved.

(1-3) Function of the Layer at Level 1

Figure 17:
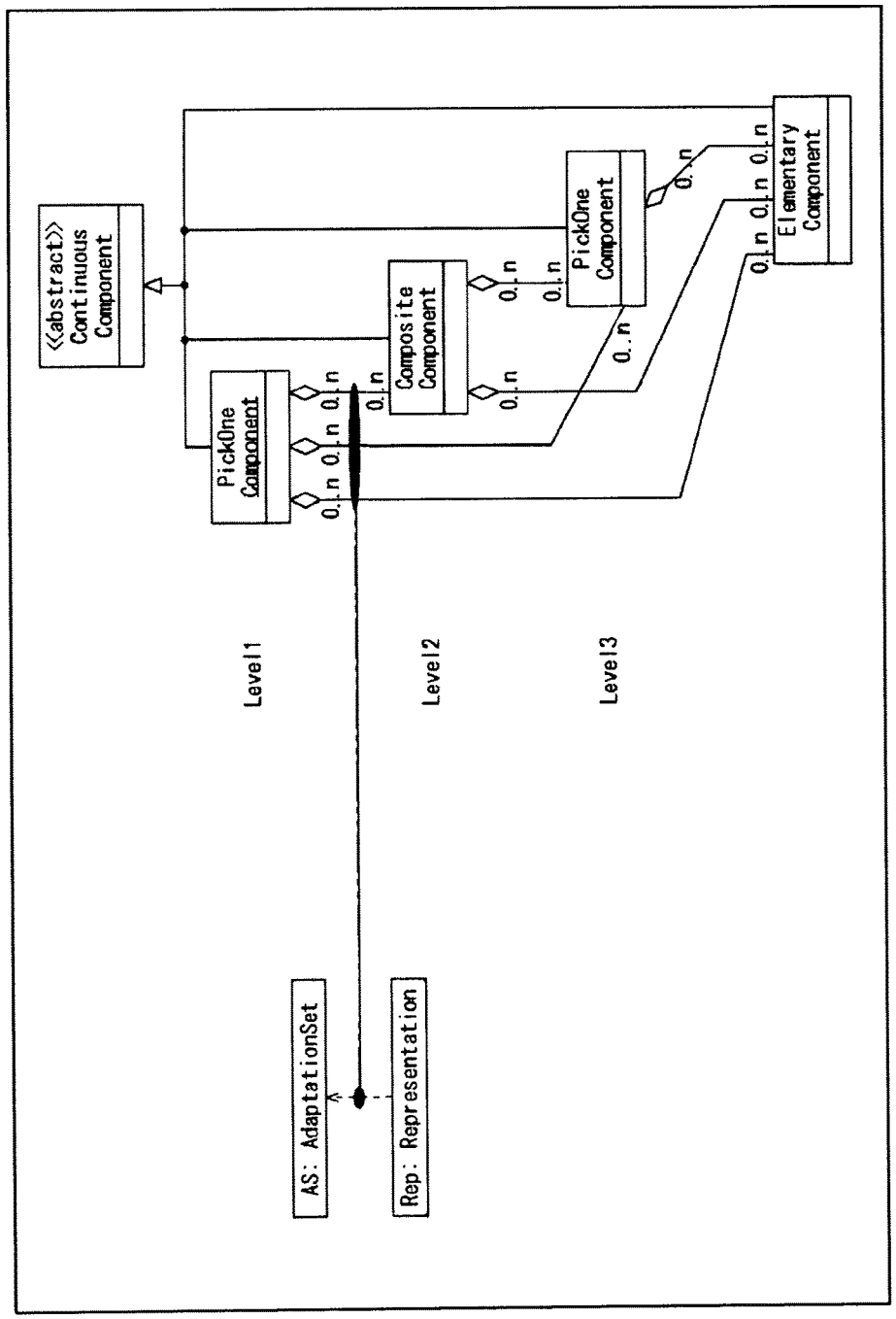
FIG. 17 A diagram showing a method of achieving the function of the layer at Level 1.

FIG. 17 is a diagram showing a method of achieving the function of the layer at Level 1 shown in FIG. 7. As shown in FIG. 17, the function of the layer at Level 1 can be achieved by mapping the PickOneComponent at Level 1 on the AdaptationSet element in the MPD, and further mapping the Representation element enumerated in the AdaptationSet element on the component that has been subjected to structuring in the layer of the Composite Component at Level 2, the component selected in the layer of the PickOneComponent at Level 3, and the Elementary Component.

That is, by using the relationship between the AdaptationSet element and Representation element in the MPD, in the layer of the PickOneComponent at Level 1, from among the component that has been subjected to structuring in the layer of the Composite Component at Level 2, the component selected in the layer of the PickOneComponent at Level 3, and the Elementary Component, one component is selected. In this case, the relationship between the AdaptationSet element and the Representation element is used, so a special expansion is unnecessary.

Figure 18:
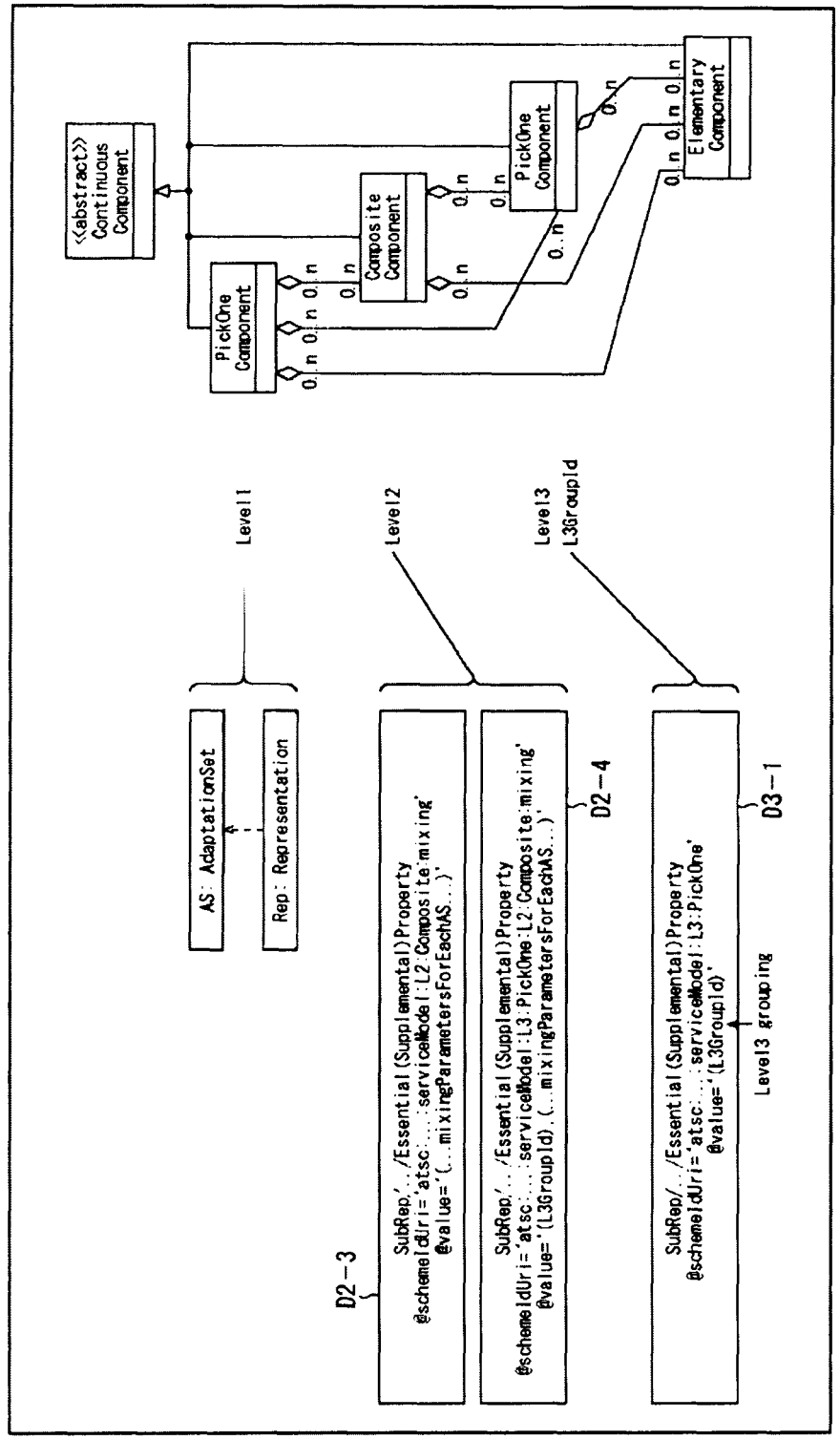
FIG. 18 A diagram showing a method of achieving functions of layers at Levels in a second embodiment.

Here, FIG. 18 shows that the methods of achieving the functions of the layers described above are brought together. That is, FIG. 18 shows the methods of achieving functions of layers at Levels in the second embodiment.

As shown in FIG. 18, the function of the layer at Level 3 is achieved by defining a new element with the use of the EssentialProperty element as the lower element of the SubRepresentation element, and performing expansion in such a manner that the target elements of the PickOneComponent at Level 3 can be grouped. In the description example D3-1 in the MPD described above, in the layer of the PickOneComponent at Level 3, a plurality of Elementary Components are grouped by the same group ID ("L3GroupId") of Level 3, and from among the plurality of Elementary Components that has been grouped, one component is selected in the example described above.

In a similar way as the function of the layer at Level 3, the function of the layer at Level 2 is achieved by defining a new element with the use of the EssentialProperty element and performing expansion in such a manner that the target elements of the Composite Component at Level 2 can be grouped. In the description examples D2-3 and D2-4 in the MPD, the plurality of SubRepresentation elements enumerated under the same Representation element are grouped by the Representation element. This is used to perform structuring (for example, mixing) for the component selected in the layer of the PickOneComponent at Level 3 and the Elementary Components which have been grouped in the example described above.

The function of the layer at Level 1 is achieved by using the relationship between the AdaptationSet element and the Representation element of the MPD. Therefore, here, a special expansion is unnecessary.

In this way, in the second embodiment, with the use of the MPD, the third layer function is achieved by grouping the plurality of elements as targets of a component selection by the EssentialProperty element. The second layer function is achieved by grouping the plurality of elements as targets of component structuring by the EssentialProperty element. The first layer function is achieved by using the relationship between the AdaptationSet element and Representation element of the MPD. As a result, the service requirement of the component layer structure shown in FIG. 7 is satisfied, and the broadcasting service can be provided with the use of the MPEG-DASH.

It should be noted that in the second embodiment, the description is mainly given on the case where the EssentialProperty elements are used as elements for grouping the target elements in the specific layer for performing selection or structuring of the components having the structure including the plurality of layers in the MPD, but is not limited thereto. Another element, attribute, or the like, for example, the SupplementalProperty element may be used.

(2) Specific Operation Examples

Subsequently, with reference to FIGS. 19 to 21, a specific operation example relating to the second embodiment will be described.

(2-1) Operation Example 4

Figure 19:
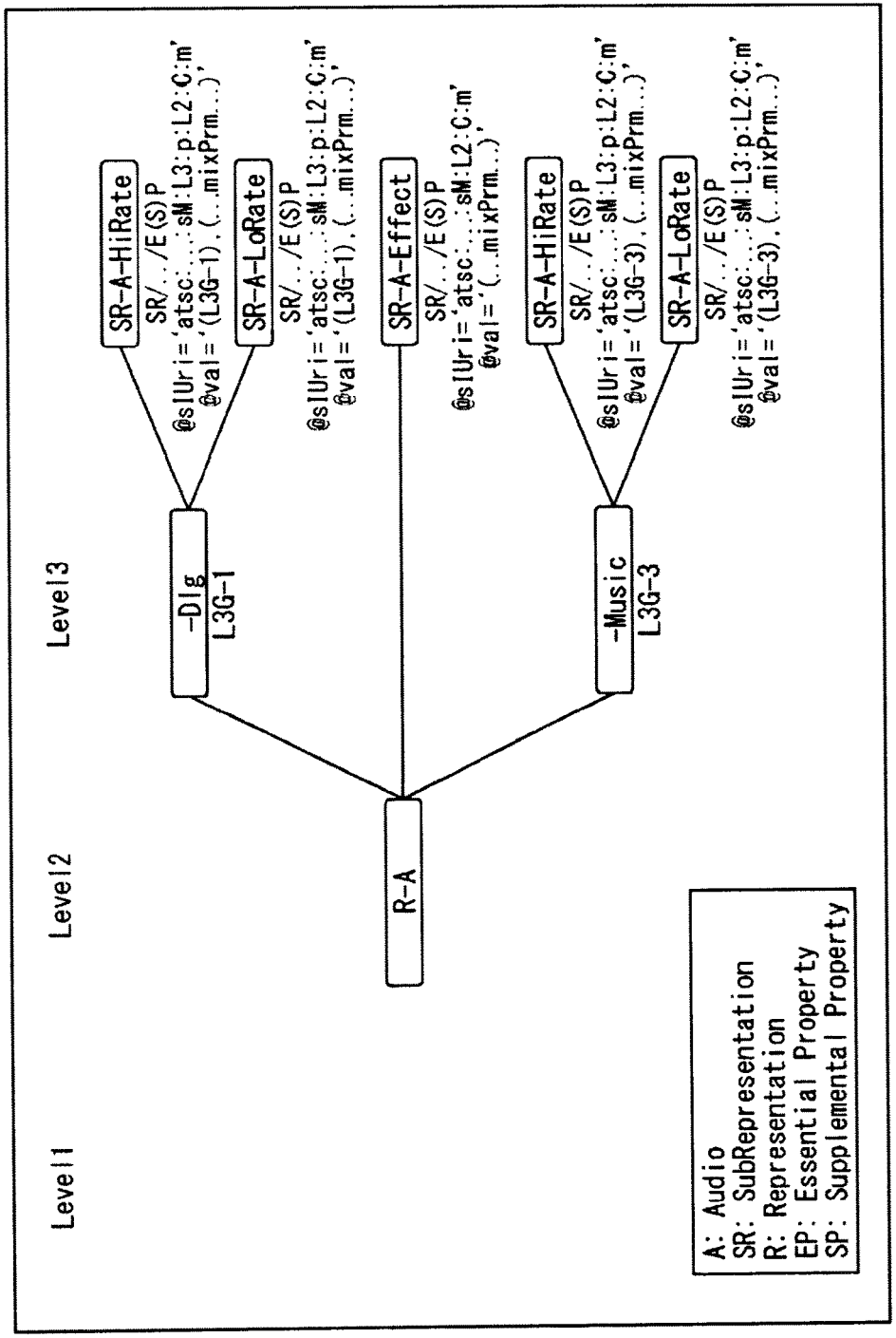
FIG. 19 A diagram for explaining an operation example 4.

FIG. 19 is a diagram for explaining an operation example 4 in which mixing reproduction of an audio stream is performed. In FIG. 19, a description content of the MPD for achieving the operation example 4 is shown, and "R" and "SR" represent the Representation element and the SubRepresentation element, respectively. Further, "EP" represents the EssentialProperty element, "@sIUri" and "@val" represent the schemeIdUri attribute and the value attribute of the EssentialProperty element, respectively. It should be noted that "SP" represents the SupplementalProperty element, but here, the case where the EssentialProperty element is used will be mainly described. Further, the relationship of those abbreviations is also used in the subsequent figures in the same way.

Here, in the operation example 4 shown in FIG. 19, as the attribute value of the schemeIdUri attribute of the EssentialProperty element in the SubRepresentation element, "atsc: . . . :sM:L3:p:L2:C:m" (abbreviation of "atsc: . . . :serviceModel:L3:pickOne:L2:Composite:mixing") is defined. This means that the audio component having the EssentialProperty element having the attribute value is selected in the layer of the PickOneComponent at Level 3 and outputted, and is subjected to mixing in the layer of the Composite Component at Level 2 and outputted.

For the value attribute of the EssentialProperty element, it is defined that the value means the group ID ("L3GroupId") of a component to be selected in the layer of the PickOneComponent at Level 3 and an arbitrary mixing parameter value. It should be noted that for grouping at the time of performing mixing, as described above, grouping for the plurality of SubRepresentation elements enumerated under the same Representation element by the Representation element is used, and therefore, it is unnecessary to define the group ID of Level 2.

Further, as the attribute value of the schemeIdUri attribute of the EssentialProperty element, "atsc: . . . :sM:L2:C:m" (abbreviation of "atsc: . . . : serviceModel:L2:Composite: mixing") is defined, and this means that the audio component having the EssentialProperty element having the attribute value is subjected to mixing in the layer of the Composite Component at Level 2 and outputted.

For the value attribute of the EssentialProperty element, it is defined that the value means an arbitrary mixing parameter value. It should be noted that for grouping at the time of mixing, as described above, the fact that the plurality of SubRepresentation elements enumerated under the same Representation element is grouped by the Representation element is used, and therefore, so it is unnecessary to define the group ID of Level 2 here.

In FIG. 19, only one Representation element corresponding to a single audio stream is described, and under the Representation element, five SubRepresentation elements are described.

In the first and second SubRepresentation elements from the top in the figure, as audio components having different bit rates, Dialogs (Dlg) at a high bit rate and a low bit rate are enumerated, and in the layer at Level 3 (PickOneComponent), for example, in accordance with a network environment condition or the like, one audio component is adaptively selected.

It should be noted that in the first and second SubRepresentation elements, as the schemeIdUri attribute of the EssentialProperty element, "atsc: . . . :sM:L3:p:L2:C:m" is specified, and as the value attribute, "L3G-1" is specified. That is, the component selected in the layer at Level 3 belongs to the selective group 1 for which the group ID ("L3GroupId") of Level 3 as "1" is specified.

In the third SubRepresentation element from the top in the figure, as the audio component, Effect (Efct) is enumerated, one audio component is selected at all times. The audio component selected in this way corresponds to the Elementary Component. It should be noted that in the third SubRepresentation element, as the schemeIdUri attribute of the EssentialProperty element, "atsc: . . . :sM:L2:C:m" is specified.

In the fourth and fifth SubRepresentation elements, as audio components having different bit rates, Music at a high bit rate and a low bit rate is enumerated, and in the layer at Level 3 (PickOneComponent), for example, in accordance with a network environment condition or the like, one audio component is adaptively selected.

It should be noted that in the fourth and fifth SubRepresentation elements, as the schemeIdUri attribute of the EssentialProperty element, "atsc: . . . :sM:L3:p:L2:C:m" is specified, and as the value attribute, "L3G-3" is specified. That is, the component selected in the layer at Level 3 belongs to a selective group 3 for which a group ID ("L3GroupId") of Level 3 as "3" is specified.

In this way, the EssentialProperty element as a lower element of the SubRepresentation element is used to define the new element and perform expansion in such a manner that the target elements of the PickOneComponent at Level 3 can be grouped, with the result that the function of the layer at Level 3 in the component layer structure shown in FIG. 7 is achieved, and the audio component selection is performed.

Further, the Dialog (Dlg) and Music selected in the layer of the PickOneComponent at Level 3 and the Effect (Efct) as the Elementary Component are enumerated in the SubRepresentation elements under the same Representation element, and thus belong to the same group. In this way, by performing grouping with the use of the relationship between the Representation element and the SubRepresentation elements, the function of the layer at Level 2 in the component layer structure is achieved, and in the layer at Level 2 (Composite Component), mixing is performed for the audio component.

As described above, in the operation example 4 shown in FIG. 19, the function of the layer at Level 3 in the component layer structure shown in FIG. 7 is achieved by grouping the target elements of the PickOneComponent at Level 3 by the schemeIdUri attribute and the value attribute of the EssentialProperty element disposed in the SubRepresentation element. Further, the function at Level 2 is achieved by performing grouping with the use of the relationship between the Representation element and the SubRepresentation elements. In this way, the functions of the layer at Level 2 and the layer at Level 3 are achieved, with the result that mixing reproduction for the audio stream is performed.

(2-2) Operation Example 5

Figure 20:
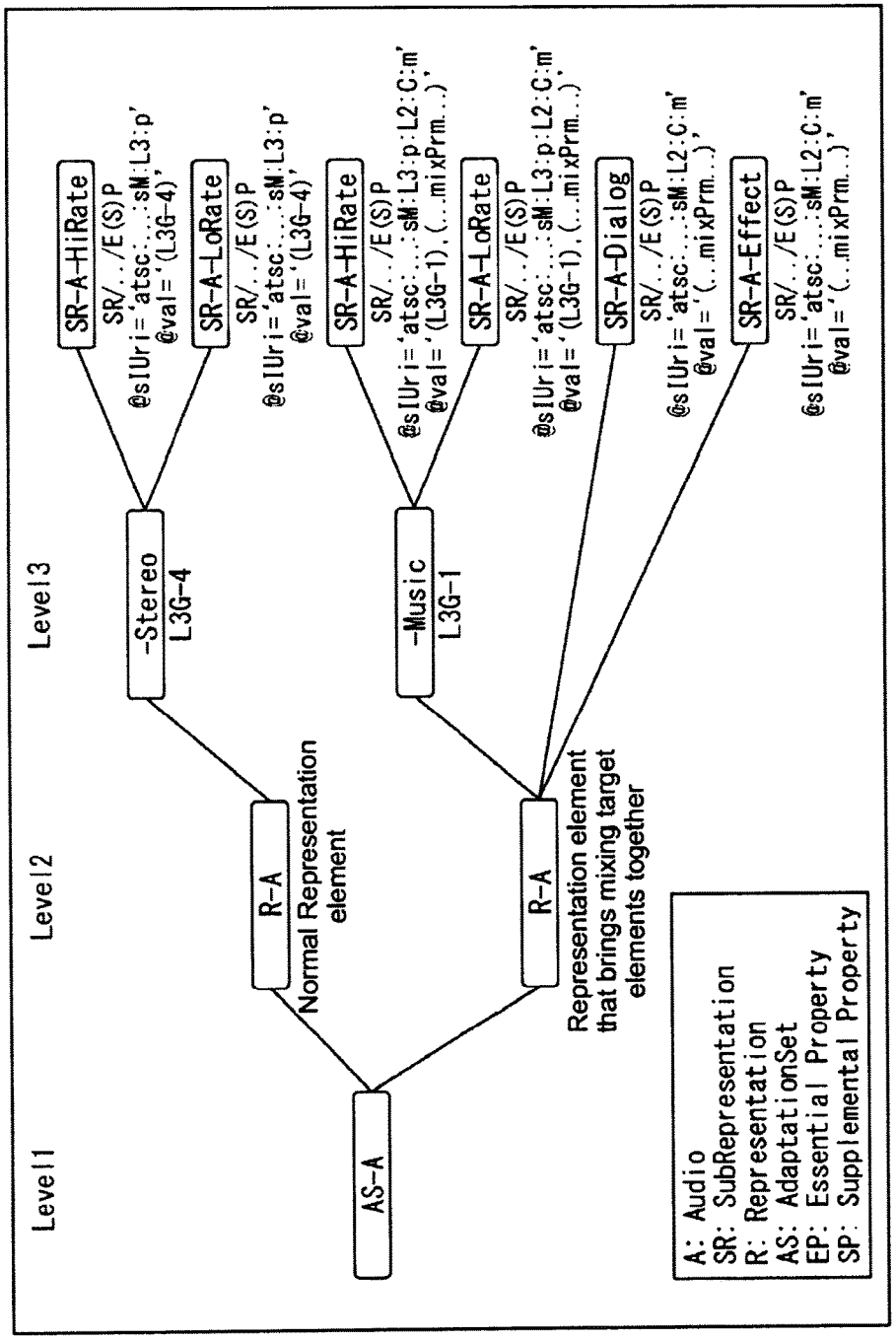
FIG. 20 A diagram for explaining an operation example 5.

FIG. 20 is a diagram for explaining an operation example 5 in which an audio stream group selection is performed.

In FIG. 20, a description content of the MPD for achieving the operation example 5 is shown, and "AS", "R", and represent the AdaptationSet element, the Representation element, and the SubRepresentation element, respectively. Further, as in FIG. 19, "@sIUri" and "@val" represent the schemeIdUri attribute and the value attribute of the EssentialProperty element.

Here, in the operation example 5 shown in FIG. 20, as the attribute value of the schemeIdUri attribute of the EssentialProperty element in the SubRepresentation element, "atsc: . . . :sM:L3:p" (abbreviation of "atsc: . . . :serviceModel:L3:pickOne") is defined, and this means that the audio component having the EssentialProperty element having the attribute value is selected in the layer of the PickOneComponent at Level 3 and outputted. For the value attribute of the EssentialProperty element, it is defined that the value means the group ID ("L3GroupId") of a component that is to be selected in the layer of the PickOneComponent at Level 3.

Further, as the attribute value of the schemeIdUri attribute of the EssentialProperty element, "atsc: . . . :sM:L3:p:L2:C:m" (abbreviation of "atsc: . . . :serviceModel:L3:pickOne:L2:Composite:mixing") is defined, and this means that the audio component having the EssentialProperty element having the attribute value is selected in the layer of the PickOneComponent at Level 3 and outputted, and is subjected to mixing in the layer of the Composite Component at Level 2 and outputted.

For the value attribute of the EssentialProperty element, it is defined that the value means the group ID ("L3GroupId") of a component that is to be selected in the layer of the PickOneComponent at Level 3 and an arbitrary mixing parameter value. It should be noted that for grouping at the time of mixing, as described above, the fact that the plurality of SubRepresentation elements enumerated under the same Representation element is grouped by the Representation element, so it is unnecessary to define the group ID of Level 2 here.

Further, as the attribute value of the schemeIdUri attribute of the EssentialProperty element, "atsc: . . . :sM:L2:C:m" (abbreviation of "atsc: . . . :serviceModel:L2:Composite:mixing") is defined, and this means that the audio component having the EssentialProperty element having the attribute value is subjected to mixing in the layer of the Composite Component at Level 2 and outputted.

For the value attribute of the EssentialProperty element, it is defined that the value means an arbitrary mixing parameter value. It should be noted that for grouping at the time of mixing, as described above, the fact that the plurality of SubRepresentation elements enumerated under the same Representation elements is grouped by the Representation element is used, and therefore it is unnecessary to define the group ID of Level 2 here.

One AdaptationSet element corresponding to a single audio stream is described, and under the AdaptationSet element, two Representation elements are described. Further, for one Representation element, two SubRepresentation elements are described, and for the other Representation element, four SubRepresentation elements are described.

In the first and second SubRepresentation elements from the top in the figure, as audio components having different bit rates, Stereos (STR) at a high bit rate and a low bit rate are enumerated, and in the layer at Level 3 (PickOneComponent), for example, in accordance with a network environment condition or the like, one audio component is adaptively selected.

It should be noted that for first and second SubRepresentation elements, as the schemeIdUri attribute of the EssentialProperty element, "atsc: . . . :sM:L3:p" is specified, and as the value attribute, "L3G-4" is specified. That is, the component selected in the layer at Level 3 belongs to a selective group 4 for which the group ID ("L3GroupId") of Level 3 as "4" is specified.

In the third and fourth SubRepresentation elements from the top in the figure, as audio components having different bit rates, Music at a high bit rate and a low bit rate is enumerated, and in the layer at Level 3 (PickOneComponent), for example, in accordance with a network environment condition or the like, one audio component is adaptively selected.

It should be noted that for the third and fourth SubRepresentation elements, as the schemeIdUri attribute of the EssentialProperty element, "atsc: . . . :sM:L3:p:L2:C:m" is specified, and as the value attribute, "L3G-1" is specified. That is, the component selected in the layer at Level 3 belongs to the selective group 1 for which the group ID ("L3GroupId") of Level 3 as "1" is specified.

In the fifth SubRepresentation element from the top in the figure, as the audio component, Dialog (Dlg) is enumerated, and one audio component is selected at all times. The audio component selected in this way corresponds to the Elementary Component. It should be noted that for the fifth SubRepresentation element, as the schemeIdUri attribute of the EssentialProperty element, "atsc: . . . :sM:L2:C:m" is specified.

In the sixth SubRepresentation element from the top in the figure, as the audio component, Effect (Efct) is enumerated, and one audio component is selected at all times. The audio component selected in this way corresponds to the Elementary Component. It should be noted that for the sixth SubRepresentation element, as the schemeIdUri attribute of the EssentialProperty element, "atsc: . . . :sM:L2:C:m" is specified.

In this way, the EssentialProperty element as the lower element of the SubRepresentation element is used to define a new element and perform expansion in such a manner that the target elements of the PickOneComponent at Level 3 can be grouped, with the result that the function of the layer at Level 3 in the component layer structure shown in FIG. 7 is achieved, and the audio component selection is performed.

Further, out of the six SubRepresentation elements, for the third to sixth SubRepresentation elements from the top in the figure, as the schemeIdUri attribute of the EssentialProperty element, "atsc: . . . :sM:L3:p:L2:C:m" or "atsc: . . . :sM:L2:C:m" is specified, so the elements are the target elements in the layer of the Composite Component at Level 2.

Then, Music selected in the layer of the PickOneComponent at Level 3 and Dialog (Dlg) and Effect (Efct) as the Elementary Components are enumerated in the SubRepresentation elements under the same Representation element, and therefore belong to the same group. In this way, by performing grouping with the use of the relationship between the Representation element and the SubRepresentation elements, the function of the layer at Level 2 in the component layer structure is achieved, and in the layer at Level 2 (Composite Component), mixing for the audio component is performed.

Further, for the AdaptationSet element, the two Representation elements are described thereunder, while in the Representation element on the upper side in the figure, out of the Stereos (STR) at the high bit rate and low bit rate which belong to the selective group 4, one audio component is selected. Further, for the Representation element on the lower side in the figure, grouping is performed with the use of the relationship between the Representation element and the SubRepresentation elements, with the result that mixing is performed for Music, Dialog (Dlg), and Effect (Efct). Then, the relationship between the AdaptationSet element and the Representation elements is used, with the result that the function of the layer at Level 1 of the component layer structure shown in FIG. 7 is achieved, and in the layer at Level 1 (PickOneComponent), one audio component is selected from the audio components of the Representation element under the AdaptationSet element.

Here, from among the audio components of the two Representation elements under the AdaptationSet element, that is, from among the audio component (Stereo) selected in the layer at Level 3 (PickOneComponent) and the audio components (Music, Dialog, and Effect) subjected to mixing in the layer at Level 2 (Composite Component), one of the audio component is selected.

As described above, in the operation example 5 shown in FIG. 20, the function of the layer at Level 3 in the component layer structure shown in FIG. 7 is achieved by grouping the target elements of PickOneComponent at Level 3 by the schemeIdUri attribute and value attribute of the EssentialProperty element disposed in the SubRepresentation element. Further, the function of the layer at Level 2 is achieved by performing grouping with the use of the relationship between the Representation element and the SubRepresentation elements. Further, the function of the layer at Level 1 is achieved by using the relationship between the AdaptationSet element and the Representation elements. In this way, the functions of the layers at Level 1, Level 2, and level 3 are achieved, with the result that the audio component group selection is performed, and the audio component reproduction is performed.

(2-3) Operation Example 6

Figure 21:
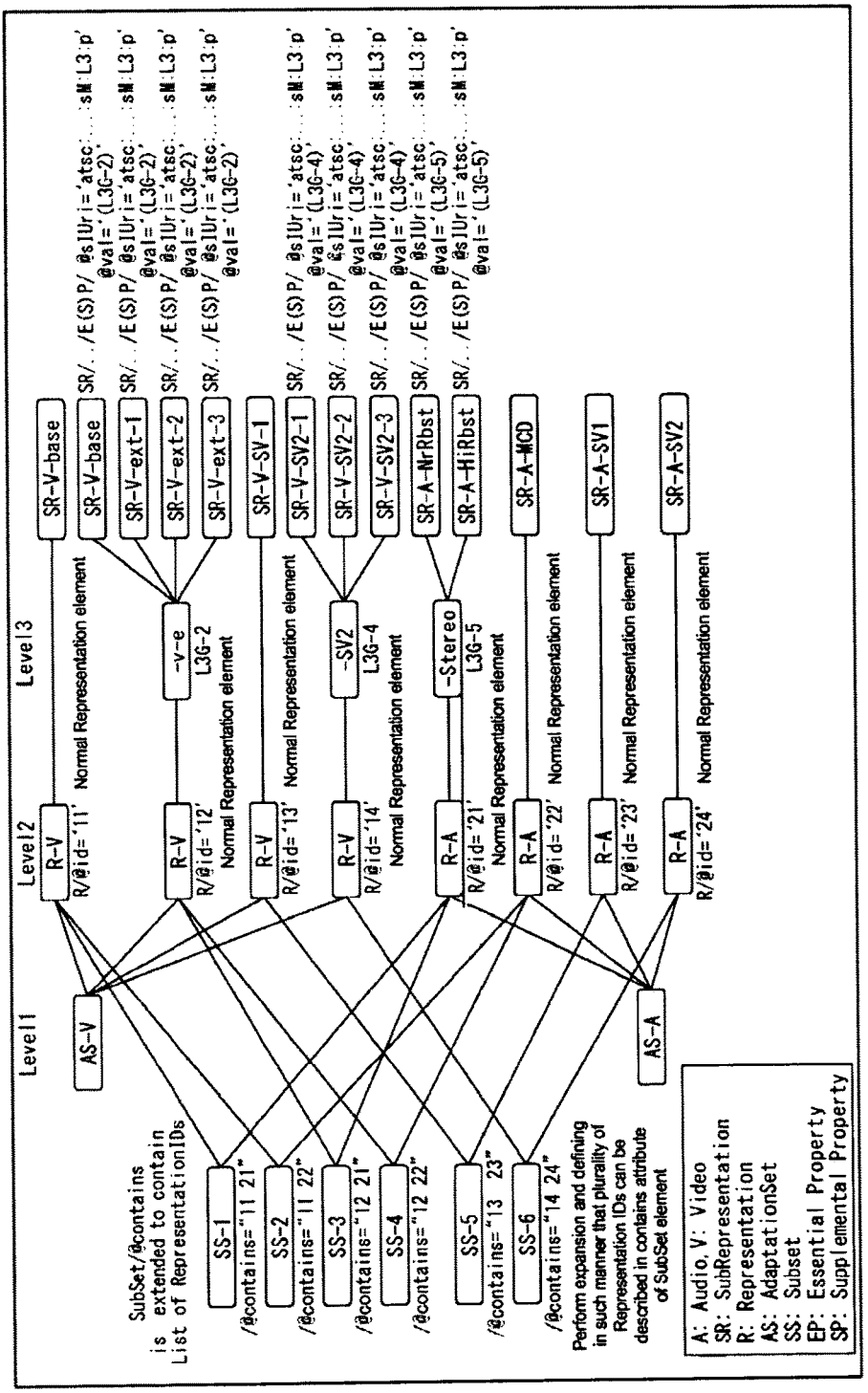
FIG. 21 A diagram for explaining an operation example 6.

FIG. 21 is a diagram for explaining an operation example 6 in which grouping for simultaneous presentation of components is performed. In FIG. 21, a description content of the MPD for achieving the operation example 6 is shown, and "AS", "R", and represent the AdaptationSet element, the Representation element, and the SubRepresentation element, respectively. Further, as in FIG. 19, FIG. 20, and the like, "@sIUri" and "@val" represent the schemeIdUri attribute and the value attribute of the EssentialProperty element, respectively. Further, for the Representation element, an id attribute indicated by "@id" is described.

Further, as in FIG. 14, "SS" represents the Subset element. To specify a set of the Representation elements in the Subset element, an id attribute value of the Representation element is stored as a list in a contains attribute of the Subset element, but here, outside of regulations relating to the component layer structure, the Subset element is used to define grouping for simultaneous presentation of a plurality of components such as video and audio components.

In the operation example 6 shown in FIG. 21, as the attribute value of the schemeIdUri attribute of the EssentialProperty element in the SubRepresentation element, "atsc: . . . :sM:L3:p" (abbreviation of "atsc: . . . :servic-eModel:L3:pickOne") is defined, and this means that the audio component having the EssentialProperty element having the attribute value is selected in the layer of the PickOneComponent at Level 3 and outputted. For the value attribute of the EssentialProperty element, it is defined that the value means the group ID ("L3GroupId") of a component that is to be selected in the layer of the PickOneComponent at Level 3.

That is, in the MPD shown in FIG. 21, four SubRepresentation elements ("base", "ext-1", "ext-2", and "ext-3") that belong to the selective group 2 of video, three SubRepresentation elements ("SV2-1", "SV2-2", and "SV2-3") that belong to video, and two SubRepresentation elements ("NrRbst" and "HiRbst") that belong to a selective group 5 of audio are described, and grouping is performed therefor as components that are to be selected in the layer of the PickOneComponent at Level 3.

It should be noted that in FIG. 21, "base" represents a video component corresponding to a basic video signal that can be reproduced alone, and "ext" represents a video component corresponding to a video signal for expansion. Further, in "SV1" and "SV2", "SV" represents a sub view as an auxiliary area with respect to a main view as a main display area. "NrRbst" means an audio component having the normal robustness. Further, "HiRbst" means an audio component having the high robustness. "MCD" represents a multi-channel audio component. Further, in "SV1" and "SV2", "SV" represents an audio component for the sub view.

Under the Representation element of id="11", only one SubRepresentation element ("V-base") is described, and one video component corresponding to a basic video signal that can be reproduced alone is selected at all times. The video component selected in this way corresponds to the Elementary Component. It should be noted that the video component is for the main view.

Under the Representation element of id="12", four SubRepresentation elements ("V-base", "V-ext-1", "V-ext-2", and "V-ext-3") are described, and the SubRepresentation element group has dependence of Base-Enhance relationship. That is, under the Representation element of id='12', one video component corresponding to a basic video signal is enumerated, and three video components corresponding to video signals for expansion are enumerated and have dependence of Base-Enhance relationship. As a result, in the layer at Level 3 (PickOneComponent), depending on a network environment condition or the like, for example, the video components corresponding to the basic video signal and the expansion video signals are selected from among the video components that belong to the selective group 2. It should be noted that the video components are for the main view.

Under the Representation element of id="13", only one SubRepresentation element ("V-SV-1") is described, one video component for the sub view 1 is selected at all times. The video component as described above corresponds to the Elementary Component.

Under the Representation element of id="14", three SubRepresentation elements ("V-SV2-1", "V-SV2-2", and "V-SV2-3") are described, three video components for the sub view 2 are enumerated, and in the layer at Level 3 (PickOneComponent), for example, in accordance with a network environment condition or the like, one video component is adaptively selected from among the video components that belong to the selective group 4.

In this way, grouping is performed by the schemeIdUri attribute and the value attribute of the EssentialProperty element, with the result that the function of the layer at Level 3 in the component layer structure shown in FIG. 7 is achieved, and in the layer at Level 3 (PickOneComponent), from among the video components in the same group, one video component is selected. It should be noted that in the operation example 6 shown in FIG. 21, in the layer at Level 2 (Composite Component), because it is unnecessary to perform grouping (structuring) to simultaneously display the plurality of video components in combination, the Representation element is used as, so to speak, a normal Representation element.

Further, by using the relationship between the AdaptationSet element and the Representation elements, the function of the layer at Level 1 is achieved, and in the layer at Level 1 (PickOneComponent), from among the video components of the Representation elements under the AdaptationSet element, one video component is selected. Here, from the video components of the four Representation elements (id="11", "12", "13", and "14"), that is, from the video components ("V-base", "V-ext-1", "V-ext-2", or "V-ext-3", and "V-SV2-1", "V-SV2-2", or "V-SV2-3") selected in the layer at Level 3 (PickOneComponent) and the Elementary Components ("V-base" and "V-SV-1"), one video component is selected.

The description is given on the video components above, while the audio components are as follows. That is, under the Representation element of id="21", two SubRepresentation elements ("A-NrRbst" and "A-HiRbst") are described, and the audio component having the normal robustness and the audio component having the high robustness are enumerated. In the layer at Level 3 (PickOneComponent), depending on a network environment condition or the like, for example, one audio component is adaptively selected from the audio components that belong to the selective group 5. It should be noted that the audio component is for the main view.

Under the Representation element of id="22", only one SubRepresentation element ("A-MCD") is described, and thus one multi-channel audio component is selected at all times. The audio component selected in this way corresponds to the Elementary Component. It should be noted that the audio component is for the main view.

Under the Representation element of id="23", only one SubRepresentation element ("A-SV1") is described, and thus one audio component for the sub view 1 is selected at all times. Similarly, under the Representation element of id="24", only one SubRepresentation element ("A-SV2") is described, and thus one audio component for the sub view 2 is selected at all times. The audio component for the sub view selected in this way corresponds to the Elementary Component.

As described above, grouping is performed by the schemeIdUri attribute and the value attribute of the EssentialProperty element in the SubRepresentation element, with the result that the function of the layer at Level 3 in the component layer structure shown in FIG. 7 is achieved, and in the layer at Level 3 (PickOneComponent), one audio component is selected from the audio components in the same group. It should be noted that in the operation example 6 shown in FIG. 21, in the layer at Level 2 (Composite Component), it is unnecessary to perform grouping (structuring) in order to display the plurality of audio components at the same time in combination, so the Representation element is used as, so to speak, a normal Representation element.

Further, by using the relationship between the AdaptationSet element and the Representation elements, the function of the layer at Level 1 is achieved, and in the layer at Level 1 (PickOneComponent), from among the audio components of the Representation elements under the AdaptationSet element, one audio component is selected. Here, from among the audio components of four Representation elements (id="21", and "24") under the AdaptationSet element, that is, from the audio component ("A-NrRbst" or "A-HiRbst") selected in the layer at Level 3 (PickOneComponent) and the Elementary Components ("A-MCD", "A-SV1", and "A-SV2"), one audio component is selected.

Further, in the MPD shown in FIG. 21, outside of regulations relating to the component layer structure, the Subset element is used to define grouping for simultaneous presentation of the plurality of components such as video and audio components.

Specifically, for a contains attribute of the third Subset element from the top in the figure, "11 21" is specified, and this means that the Representation element of id="11" and the Representation element of id="21" are a set of the Representation elements which is simultaneously presented. That is, the video component ("V-base") and the audio component ("A-NrRbst" or "A-HiRbst") are components for the main view to be simultaneously reproduced.

For a contains attribute of the second Subset element from the top in the figure, "11 22" is specified, and this means that the Representation element of id="11" and the Representation element of id="22" are a set of the Representation elements which is simultaneously presented. That is, the video component ("V-base") and the audio component ("A-MCD") are components for the main view to be simultaneously reproduced.

For a contains attribute of the third Subset element from the top in the figure, "12 21" is specified, and this indicates that the Representation element of id="12" and the Representation element of id="21" are a set of the Representation elements which is simultaneously presented. That is, the video components ("V-base" and "V-ext") and the audio component ("A-NrRbst" or "A-HiRbst") are components for the main view to be simultaneously reproduced.

For a contains attribute of the fourth Subset element from the top in the figure, "12 22" is specified, and this indicates that the Representation element of id="12" and the Representation element of id="22" are a set of the Representation elements which is simultaneously presented. That is, the video components ("V-base" and "V-ext") and the audio component ("A-MCD") are components for the main view to be simultaneously reproduced.

For a contains attribute of the fifth Subset element from the top in the figure, "13 23" is specified, and this indicates that the Representation element of id="13" and the Representation element of id="23" are a set of the Representation elements which is simultaneously presented. That is, the video component ("V-SV1") and the audio component ("A-SV1") are components for the sub view 1 to be simultaneously reproduced.

For a contains attribute of the sixth Subset element from the top in the figure, "14 24" is specified, and this indicates that the Representation element of id="14" and the Representation element of id="24" are a set of the Representation elements which is simultaneously presented. That is, the video component ("V-SV2") and the audio component ("A-SV2") are components for the sub view 2 to be simultaneously reproduced.

As described above, in the operation example 6 shown in FIG. 21, the Subset elements are used to define grouping for simultaneous presentation of the plurality of components such as video and audio components outside of regulations relating to the component layer structure shown in FIG. 7, with the result that, for example, it is possible to perform associating between the video and audio components for the main view, for the sub view 1, or for the sub view 2. It should be noted that because associating as described above is performed, for example, when one of the video and audio components is specified, the other component can be specified.

5. System Configuration

Configuration Example of Broadcast Communication System

Figure 22:
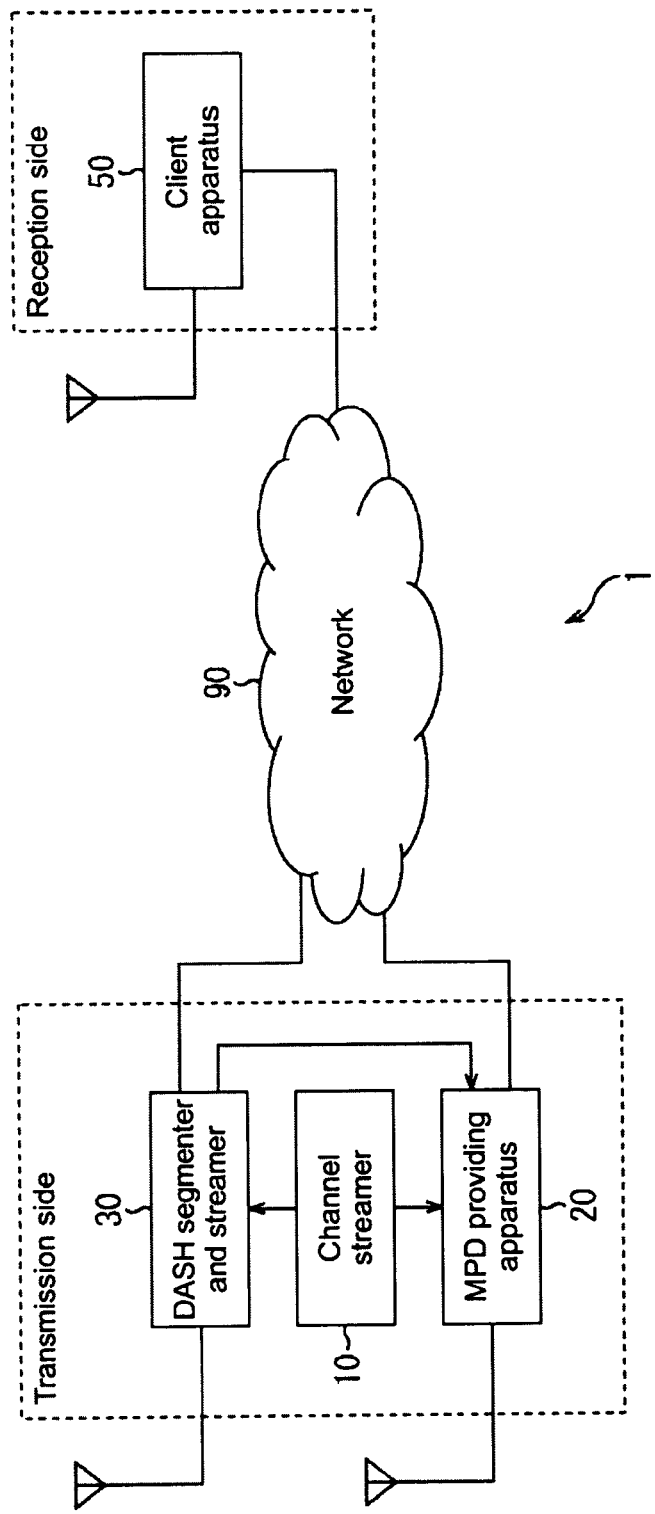
FIG. 22 A diagram showing a configuration example of a broadcast communication system.

FIG. 22 is a diagram showing a configuration example of a broadcast communication system to which the present technology is applied.

As shown in FIG. 22, a broadcast communication system 1 is composed of a channel streamer 10, an MPD providing apparatus 20, a DASH segmenter and streamer 30, and a client apparatus 50. Further, the client apparatus 50 is connected with the MPD providing apparatus 20 and the DASH segmenter and streamer 30 with each other via a network 90 such as the Internet. It should be noted that the channel streamer 10, the MPD providing apparatus 20, and the DASH segmenter and streamer 30, which are apparatuses on a transmission side are provided by a broadcaster and equipped in a broadcasting station or the like, for example. Further, the client apparatus 50, which is an apparatus on a reception side is installed in each home or the like of viewers.

The channel streamer 10 provides metadata of a content constituted of various components such as video, audio, and caption to the MPD providing apparatus 20. Further, the channel streamer 10 provides stream data of a content constituted of various components such as video, audio, and caption to the DASH segmenter and streamer 30.

Here, for example, in a service for providing a content, to achieve an adaptive streaming delivery, as components that constitute the content, video or audio components with different bit rates of 1 Mbps, 5 Mbps, 10 Mbps, 20 Mbps, or the like are prepared. The channel streamer 10 provides those components to the DASH segmenter and streamer 30 as stream data.

On the basis of the metadata provided by the channel streamer 10 and segment metadata provided by the DASH segmenter and streamer 30, the MPD providing apparatus 20 generates an MPD (Media Presentation Description). The generated MPD is transmitted by using broadcasting or communication.

That is, in the MPD providing apparatus 20, in the case where the MPD is transmitted with digital broadcast signals, for example, an MPD file is subjected to a periodical multicast delivery by an FLUTE (File Delivery over Unidirectional Transport) session. Further, in the case where the MPD is transmitted via a communication network in the MPD providing apparatus 20, for example, in response to a request of the MPD from the client apparatus 50, the MPD file is subjected to a unicast delivery to the client apparatus 50 via the network 90.

On the basis of stream data of the content provided from the channel streamer 10, the DASH segmenter and streamer 30 generates segment data. The generated segment data is transmitted by using broadcasting or communication.

That is, in the DASH segmenter and streamer 30, in the case where the segment data is transmitted with the digital broadcast signal, for example, the segment data is subjected to the periodical multicast delivery by the FLUTE session. Further, in the DASH segmenter and streamer 30, in the case where the segment data is transmitted via the network, for example, in response to a request of the segment data from the client apparatus 50, the segment data is subjected to the unicast delivery to the client apparatus 50 via the network 90.

The client apparatus 50 receives the MPD file that is subjected to the multicast delivery or the unicast delivery by the MPD providing apparatus 20. Further, on the basis of the MPD file, the client apparatus 50 selects an optimal component from candidates of a plurality of components that constitute the content. On the basis of a result of the component selection, the client apparatus 50 receives the segment data subjected to the multicast delivery or the unicast delivery by the DASH segmenter and streamer 30. Then, the client apparatus 50 restores stream data of the content from the received segment data, thereby reproducing the content. It should be noted that the client apparatus 50 corresponds to the receiver described above.

The broadcast communication system 1 is configured as described above. Subsequently, a description will be given on detailed structure of each of apparatuses that constitute the broadcast communication system 1 shown in FIG. 22.

(Configuration Example of Apparatus on Transmission Side)

Figure 23:
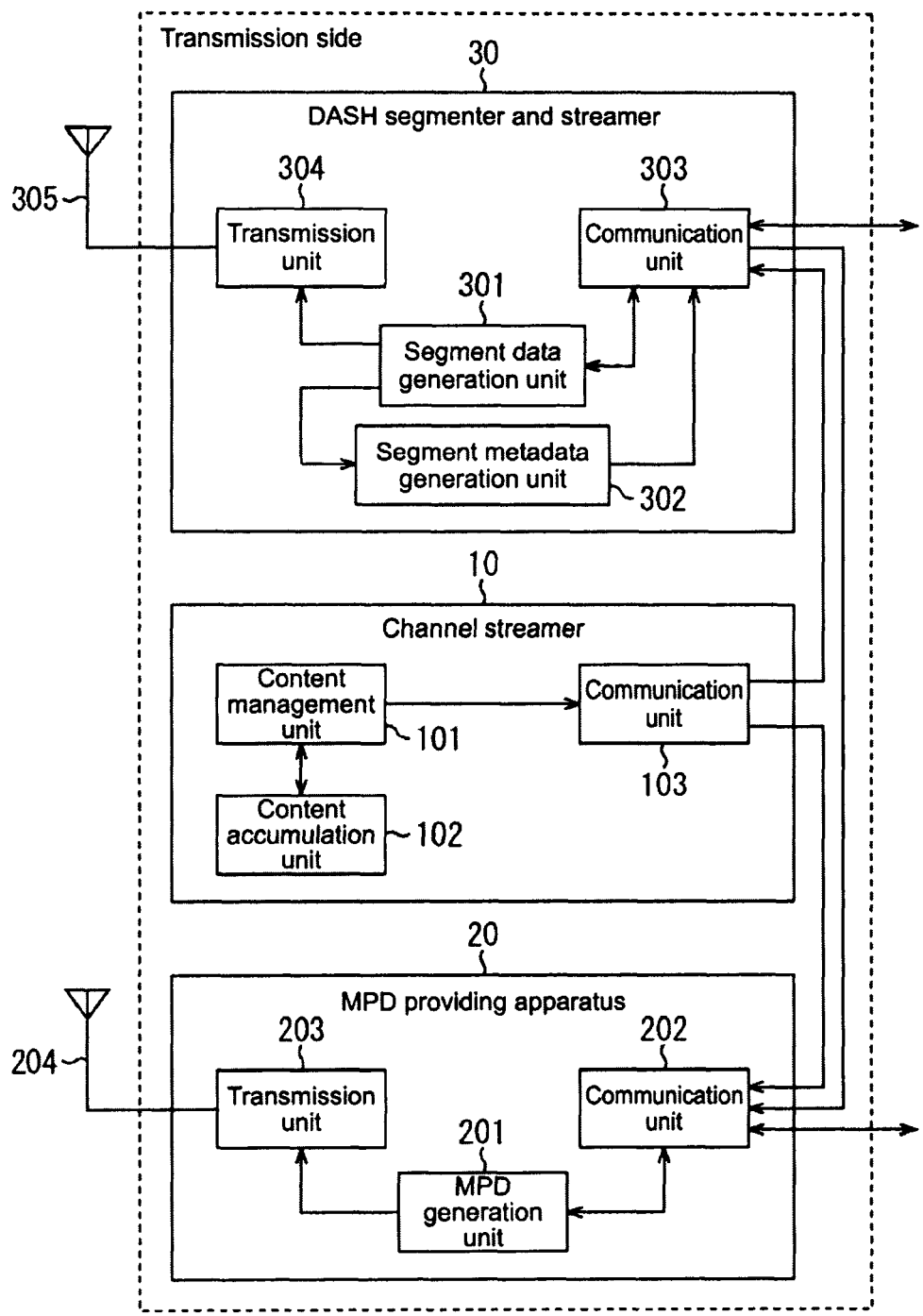
FIG. 23 A diagram showing a configuration example of apparatuses on a transmission side.

FIG. 23 is a diagram showing a configuration example of the apparatuses on the transmission side.

As shown in FIG. 23, the apparatuses on the transmission side are constituted of the channel streamer 10, the MPD providing apparatus 20, and the DASH segmenter and streamer 30.

The channel streamer 10 is constituted of a content management unit 101, a content accumulation unit 102, and a communication unit 103. The content management unit 101 manages contents accumulated in the content accumulation unit 102.

On the basis of control from the content management unit 101, the communication unit 103 supplies the metadata of the contents accumulated in the content accumulation unit 102 to the MPD providing apparatus 20. Further, on the basis of control from content management unit 101, the communication unit 103 supplies the stream data of the contents accumulated in the content accumulation unit 102 to the DASH segmenter and streamer 30.

The MPD providing apparatus 20 is constituted of an MPD generation unit 201, a communication unit 202, and a transmission unit 203.

The communication unit 202 receives metadata of a content provided from the channel streamer 10 and segment metadata provided from the DASH segmenter and streamer 30, and supplies the data to the MPD generation unit 201. On the basis of the metadata and segment metadata supplied from the communication unit 202, the MPD generation unit 201 generates an MPD file, and supplies the file to the communication unit 202 or the transmission unit 203.

In response to a request of the MPD from the client apparatus 50, the communication unit 202 transmits the MPD file supplied from the MPD generation unit 201 to the client apparatus 50 via the network 90. Further, the transmission unit 203 modifies the MPD file supplied from the MPD generation unit 201, and transmits the file with a digital broadcast signal via an antenna 204. It should be noted that, at this time, the MPD file is transmitted by the FLUTE session, for example.

The DASH segmenter and streamer 30 is constituted of a segment data generation unit 301, a segment metadata generation unit 302, a communication unit 303, and a transmission unit 304.

The communication unit 303 receives stream data of the content provided from the channel streamer 10, and supplies the data to the segment data generation unit 301. On the basis of the stream data of the content supplied from the communication unit 303, the segment data generation unit 301 generates segment data, and supplies the data to the communication unit 303 or transmission unit 304.

In response to a request of the segment data from the client apparatus 50, the communication unit 303 transmits the segment data supplied from the segment data generation unit 301 to the client apparatus 50 via the network 90. Further, the transmission unit 304 modulates the segment data supplied from the segment data generation unit 301, and transmits the data with a digital broadcast signal via an antenna 305. It should be noted that at this time, the segment data is transmitted is transmitted by the FLUTE session, for example.

Further, the segment data generation unit 301 supplies the generated segment data to the segment metadata generation unit 302. On the basis of the segment data supplied from the segment data generation unit 301, the segment metadata generation unit 302 generates the segment metadata and supplies the data to the communication unit 303. The communication unit 303 supplies the segment metadata supplied from the segment metadata generation unit 302 to the MPD providing apparatus 20.

It should be noted that in FIG. 22 and FIG. 23, for convenience of explanation, the channel streamer 10, the MPD providing apparatus 20, and the DASH segmenter and streamer 30 on the transmission side are separated apparatuses. However, the apparatuses on the transmission side only have to have the functional configuration shown in FIG. 23, so it is possible to take the channel streamer 10, the MPD providing apparatus 20, and the DASH segmenter and streamer 30 as one apparatus, for example. At this time, for example, overlapped functions of the communication unit, the transmission unit, and the like can be combined into one.

(Configuration Example of Apparatus on Reception Side)

Figure 24:
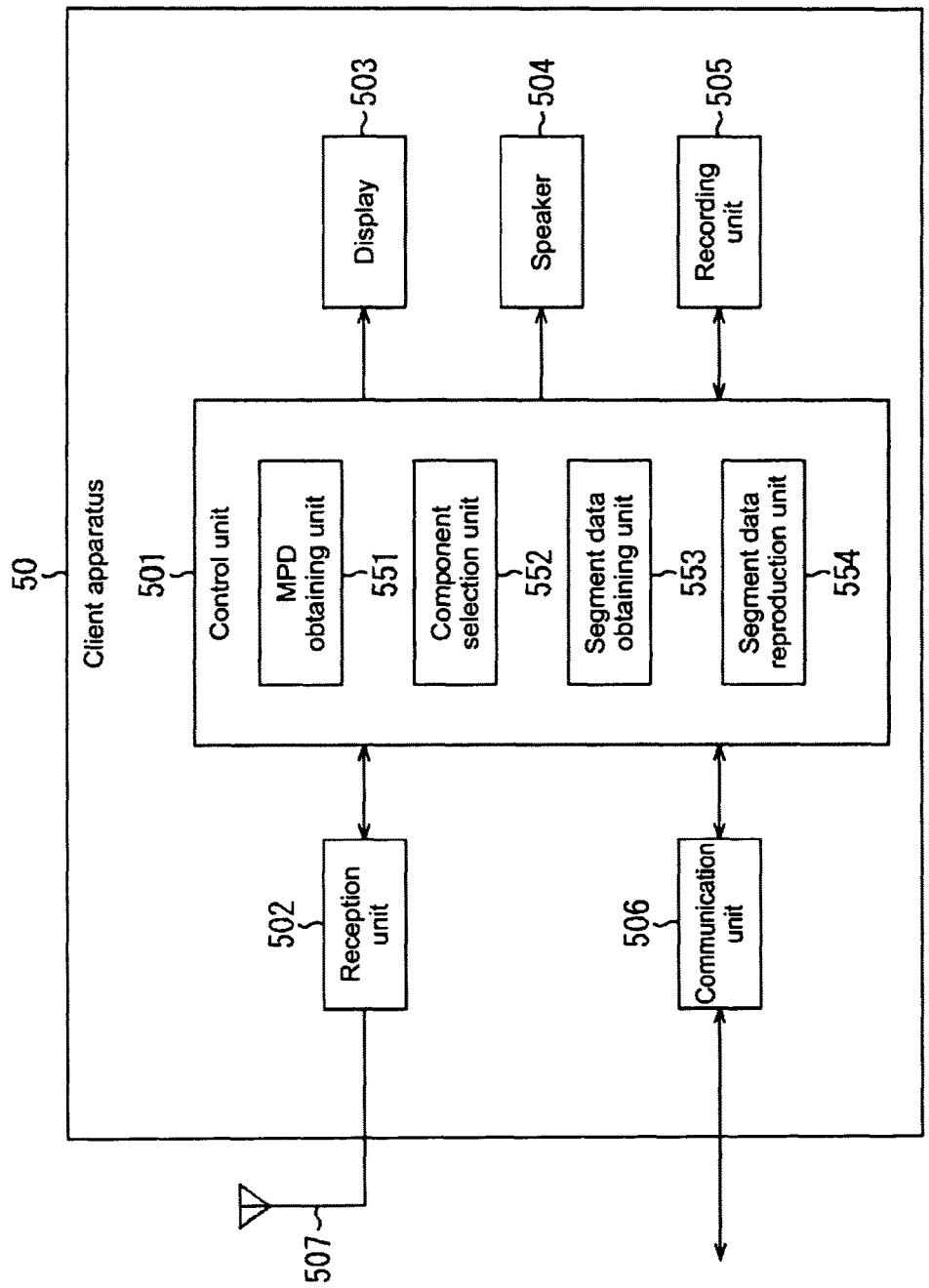
FIG. 24 A diagram showing a configuration example of apparatuses on a reception side.

FIG. 24 is a diagram showing a configuration example of the client apparatus on a reception side.

As shown in FIG. 24, the client apparatus 50 is constituted of a control unit 501, a reception unit 502, a display 503, a speaker 504, a recording unit 505, and a communication unit 506.

The control unit 501 controls operations of units of the client apparatus 50.

The reception unit 502 receives, on the basis of control from the control unit 501, a digital broadcast signal transmitted from the apparatus on the transmission side via an antenna 507. The reception unit 502 demodulates the digital broadcast signal, and supplies data thus obtained to the control unit 501. The control unit 501 performs various processes with respect to the data supplied from the reception unit 502.

The display 503 displays, on the basis of control from the control unit 501, video or caption corresponding to the stream data of the content. The speaker 504 outputs, on the basis of control from the control unit 501, audio corresponding to the stream data of the content.

For example, the recording unit 505 is composed of a hard disk or the like, and records, on the basis of control from the control unit 501, the stream data of the content and the like. The communication unit 506 transmits or receives, on the basis of control from the control unit 501, various pieces of data with the apparatus on the transmission side via the network 90.

Further, the control unit 501 is constituted of an MPD obtaining unit 551, a component selection unit 552, a segment data obtaining unit 553, and a segment data reproduction unit 554.

The MPD obtaining unit 551 controls the reception unit 502 or the communication unit 506, thereby obtaining an MPD file by broadcasting or communication and supplying the file to the component selection unit 552. The component selection unit 552 selects, on the basis of the MPD file supplied from the MPD obtaining unit 551, an optimal component from among a plurality of component candidates, and supplies a result of the selection to the segment data obtaining unit 553.

On the basis of the selection result from the component selection unit 552, the segment data obtaining unit 553 controls the reception unit 502 or the communication unit 506, thereby obtaining the segment data transmitted by broadcasting or communication, and supplying the data to the segment data reproduction unit 554. The segment data reproduction unit 554 supplies video stream data obtained from the segment data from the segment data obtaining unit 553 to the display 503, and supplies audio stream data obtained therefrom to the speaker 504. As a result, a video of the content is displayed on the display 503, and audio synchronized with the video is outputted from the speaker 504.

It should be noted that in the configuration of the client apparatus 50 shown in FIG. 24, the display 503 and the speaker 504 are included. However, the client apparatus may not include the display 503 and the speaker 504 as a single body, and those may be incorporated in a television receiver, a video recorder, or the like.

6. Specific Process Flow in Apparatuses

As described above, the apparatus on the transmission side performs unicast delivery of the MPD file or the segment data in response to the request from the client apparatus 50 on the reception side in some cases, and performs periodical multicast delivery irrespective of the request from the client apparatus 50 on the reception side in the other cases. In view of this, hereinafter, description will be given on the case where the multicast delivery of the MPD file or the segment data is performed and the case where the unicast delivery thereof is performed.

(Flow of Process at Time when Multicast Delivery)

Figure 25:
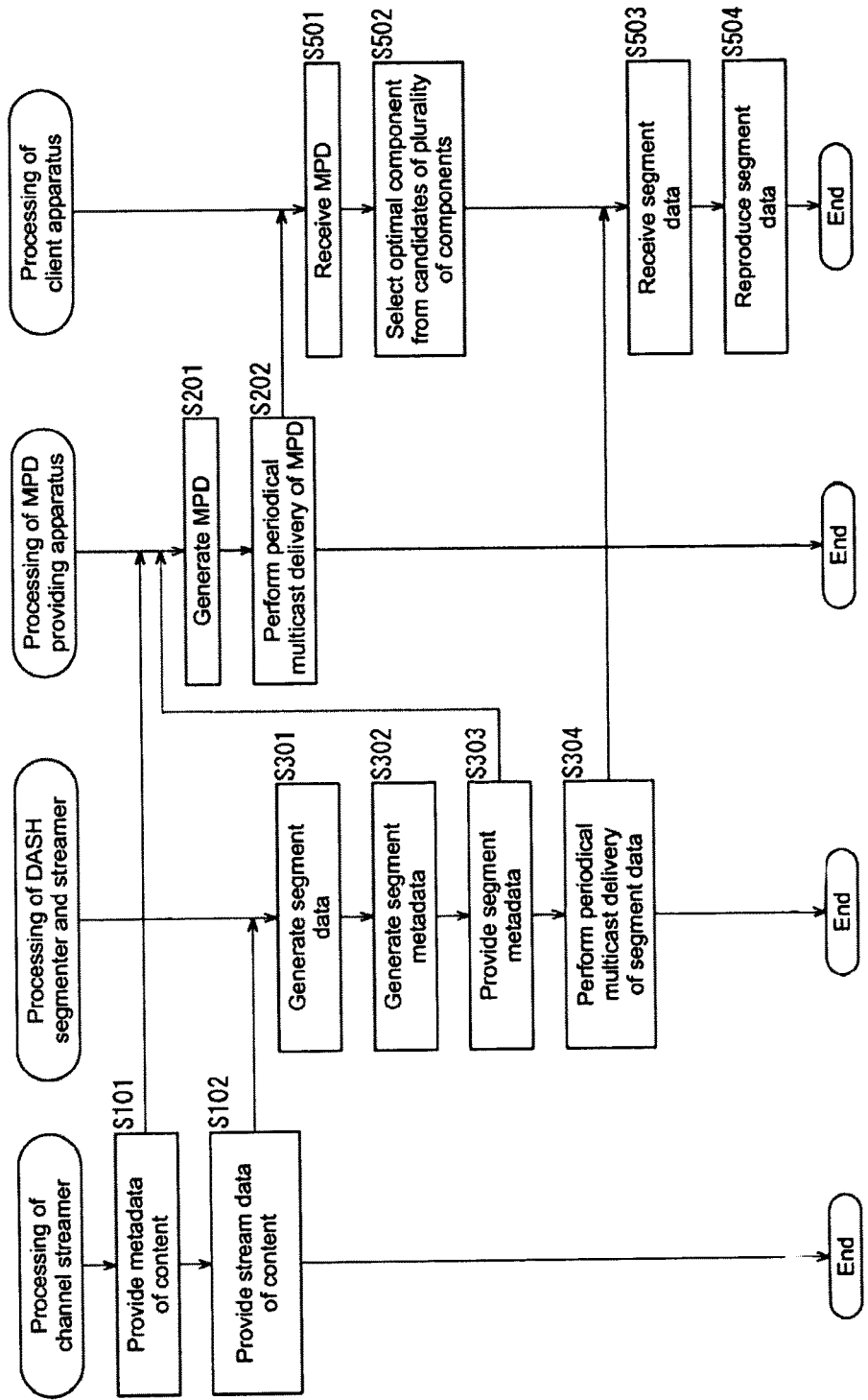
FIG. 25 A flowchart for explaining a specific process flow in apparatuses at a time of multicast delivery.

First, with reference to a flowchart shown in FIG. 25, a specific process flow in apparatuses at a time of multicast delivery will be described. It should be noted that FIG. 25 shows a flow of processing in the channel streamer 10, the MPD providing apparatus 20, and the DASH segmenter and streamer 30 as apparatuses on the transmission side, and a flow of processing in the client apparatus 50 as an apparatus on the reception side.

The channel streamer 10 performs processes of Steps S101 to S102. Specifically, in Step S101, the content management unit 101 obtains metadata of a content from the content accumulation unit 102, and provides the data to the MPD providing apparatus 20 via the communication unit 103. Further, in Step S102, the content management unit 101 obtains stream data of the content from the content accumulation unit 102, and supplies the data to the DASH segmenter and streamer 30 via the communication unit 103.

The MPD providing apparatus 20 performs processes of Step S201 to S202. Specifically, in the MPD providing apparatus 20, the metadata of content provided from the channel streamer 10 and the segment metadata provided from the DASH segmenter and streamer 30 are obtained (Steps S101, S303). In Step S201, the MPD generation unit 201 generates an MPD on the basis of the metadata and segment metadata of the content.

In Step S202, the transmission unit 203 transmits a digital broadcast signal corresponding to the MPD generated in Step S201 via the antenna 204. Here, an MPD file is subjected to the periodical multicast delivery by the FLUTE session.

The DASH segmenter and streamer 30 performs processes of Steps S301 to S304. Specifically, in the DASH segmenter and streamer 30, the stream data of the content provided from the channel streamer 10 is obtained (Step S102). In Step S301, the segment data generation unit 301 generates segment data on the basis of the stream data of the content. Further, in Step S302, the segment metadata generation unit 302 generates segment metadata on the basis of the segment data generated in Step S301.

In Step S303, the communication unit 303 provides the segment metadata generated in Step S302 to the MPD providing apparatus 20. Further, in Step S304, the transmission unit 304 transmits a digital broadcast signal corresponding to the segment data generated in Step S301 via the antenna 305. Here, the segment data is subjected to the periodic multicast delivery by the FLUTE session.

The client apparatus 50 performs processes of Steps S501 to 504. Specifically, in Step S501, the reception unit 502 receives, via the antenna 507, a digital broadcast signal corresponding to the MPD that is subjected to the multicast delivery from the MPD providing apparatus 20. Here, the MPD obtaining unit 551 obtains an MPD file transmitted by the FLUTE session, which is obtained by demodulating the digital broadcast signal.

In Step S502, the component selection unit 552 selects an optimal component from a plurality of component candidates on the basis of the MPD file obtained in Step S501. Here, the component has the component layer structure shown in FIG. 7. As described in the first embodiment and the second embodiment, in accordance with the description content of the MPD file, the functions of the layers at Level 1 to level 3 are achieved, and an optical component is selected.

In Step S503, the reception unit 502 receives, via the antenna 507, a digital broadcast signal corresponding to the segment data that is subjected to the multicast delivery from the DASH segmenter and streamer 30. Here, on the basis of a result of the selection process in Step S502, the segment data obtaining unit 553 obtains the segment data subjected to the multicast delivery from the DASH segmenter and streamer 30 and transmitted by the FLUTE session.

In Step S504, the segment data reproduction unit 554 restores the stream data of the content from the segment data obtained in Step S503, and supplies the video stream data and the audio stream data to the display 503 and the speaker 504, respectively. As a result, the video of the content is displayed on the display 503, the audio synchronized with the video is outputted from the speaker 504.

In the above, the specific process flow in the apparatuses at the time of the multicast delivery is described.

(Process Flow at Time of Unicast Delivery)

Figure 26:
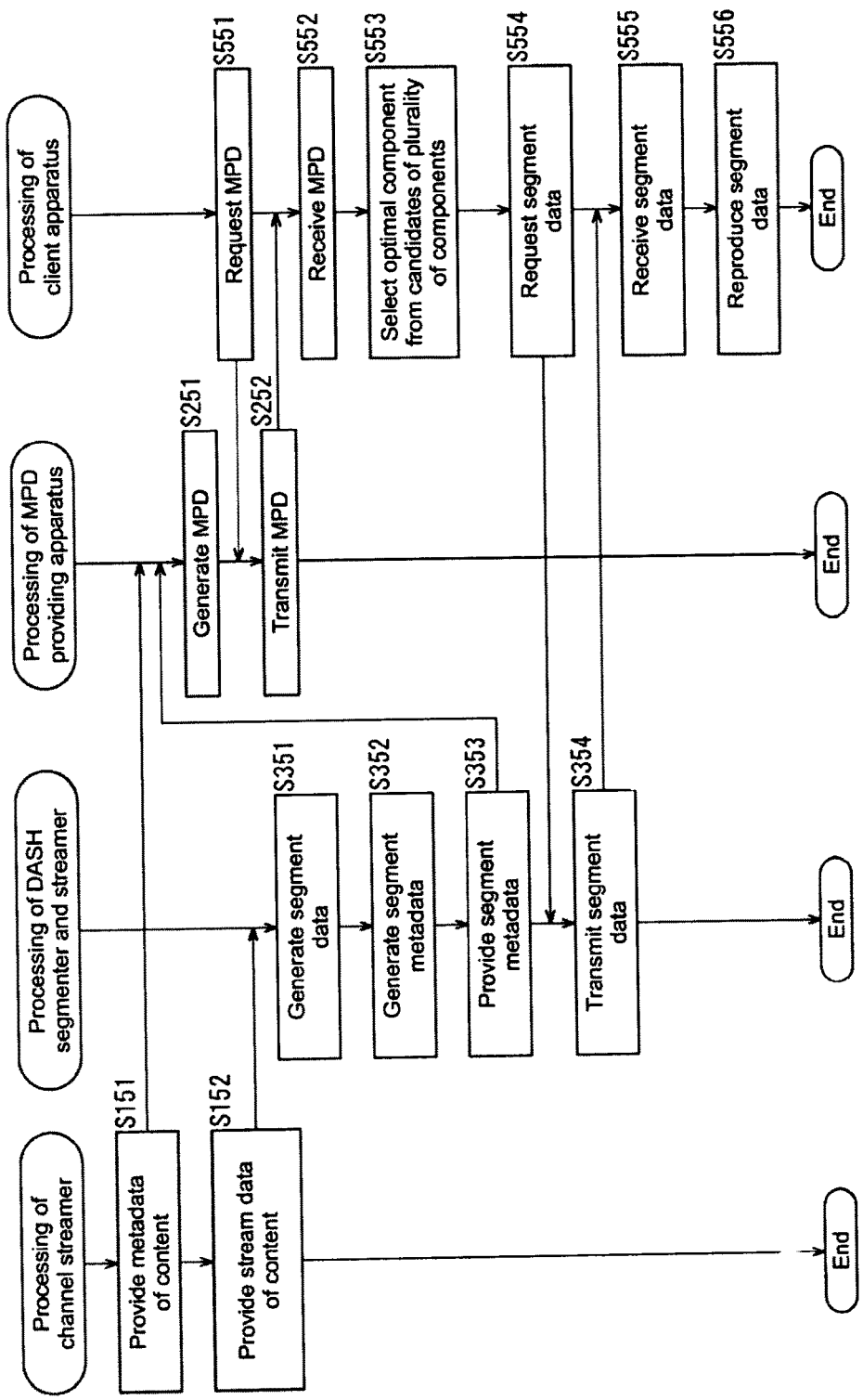
FIG. 26 A flowchart for explaining a specific process flow in apparatuses at a time of unicast delivery.

Subsequently, with reference to a flow chart shown in FIG. 26, a specific process flow in apparatuses at the time of the unicast delivery will be described. It should be noted that in FIG. 26, as in FIG. 25, a process flow in the channel streamer 10, the MPD providing apparatus 20, and the DASH segmenter and streamer 30 as the apparatuses on the transmission side is shown, and a process flow in the client apparatus 50 as apparatus on the reception side is shown.

The content of processes in Steps S151 to 152 performed by the channel streamer 10 is similar to the processes in Step S101 to S102 shown in FIG. 25. That is, in Steps S151 to 152, metadata of the content is provided to the MPD providing apparatus 20, and stream data of the content is supplied to the DASH segmenter and streamer 30.

The MPD providing apparatus 20 performs processes in Steps S251 to S252. Specifically, in the MPD providing apparatus 20, metadata of the content provided from the channel streamer 10 and segment metadata provided from the DASH segmenter and streamer 30 (Steps S151, S353). In Step S251, the MPD generation unit 201 generates an MPD file on the basis of the metadata and the segment metadata of the content.

In Step S252, upon reception of a request of the MPD from the client apparatus 50, in response to the request of the MPD, the communication unit 202 transmits the MPD file generated in Step S251 to the client apparatus 50 via the network 90.

The DASH segmenter and streamer 30 performs processes in Steps S351 to S354. Specifically, in the DASH segmenter and streamer 30, stream data of the content provided from the channel streamer 10 is obtained (Step S152). In Step S351, on the basis of the stream data of the content, the segment data generation unit 301 generates the segment data. Further, in Step S352, the segment metadata generation unit 302 generates the segment metadata on the basis of the segment data generated in Step S351.

In Step S353, the communication unit 303 provides the segment metadata generated in Step S352 to the MPD providing apparatus 20. Further, in Step S354, upon reception of a request of the segment data from the client apparatus 50, in response to the request of the segment data, the communication unit 303 transmits the segment data generated in Step S351 to the client apparatus 50 via the network 90.

The client apparatus 50 performs processes in Steps S551 to S556. Specifically, in Step S551, the communication unit 506 requests, on the basis of control from the MPD obtaining unit 551, the MPD by accessing the MPD providing apparatus 20 via the network 90. In Step S552, the communication unit 506 receives, on the basis of control from the MPD obtaining unit 551, an MPD file subjected to unicast delivery from the MPD providing apparatus 20 via the network 90.

In Step S553, the component selection unit 552 selects an optimal component from a plurality of component candidates on the basis of the MPD file obtained in Step S552. Here, the component has the component layer structure shown in FIG. 7. As described in the first embodiment and the second embodiment, in accordance with the description content of the MPD file, the functions of the layers at Level 1 to level 3 are achieved, and thus the optimal component is selected.

In Step S554, the communication unit 506 requests, on the basis of control from the segment data obtaining unit 553, the segment data by accessing the DASH segmenter and streamer 30 via the network 90. In Step S555, the communication unit 506 receives, on the basis of control from the segment data obtaining unit 553, the segment data subjected to the unicast delivery from the DASH segmenter and streamer 30 via the network 90.

In Step S556, the segment data reproduction unit 554 restores the stream data of the content from the segment data obtained in Step S555, and supplies video stream data and audio stream data to the display 503 and the speaker 504, respectively. As a result, the video of the content is displayed on the display 503, and the audio synchronized with the video is outputted from the speaker 504.

In the above, the specific process flow in the apparatuses at the time of the unicast delivery is described.

7. Configuration of Computer

Figure 27:
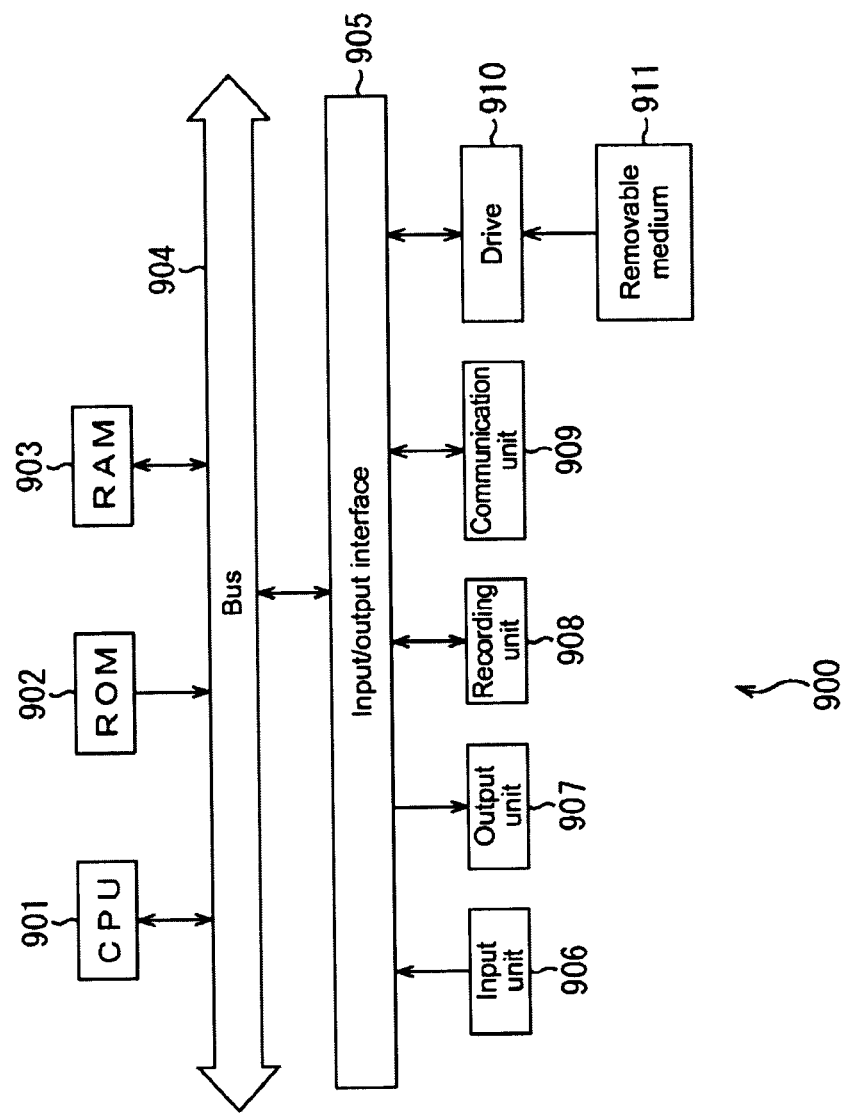
FIG. 27 A diagram showing a configuration example of a computer.

The above-mentioned series of processing may be executed by hardware or may be executed by software. If the series of processing is executed by software, programs configuring that software are installed into a computer. FIG. 27 is a diagram showing a configuration example of hardware of a computer that executes the above-mentioned series of processing according to the programs.

In a computer 900, a CPU (Central Processing Unit) 901, a ROM (Read Only Memory) 902, and a RAM (Random Access Memory) 903 are connected to one another via a bus 904. An input/output interface 905 is further connected to the bus 904. An input unit 906, an output unit 907, a recording unit 908, a communication unit 909, and a drive 910 are connected to the input/output interface 905.

The input unit 906 is constituted of a keyboard, a mouse, a microphone, and the like. The output unit 907 is constituted of a display, a speaker, and the like. The recording unit 908 is constituted of a hard disk, a nonvolatile memory, and the like. The communication unit 909 is constituted of a network interface and the like. The drive 910 drives a removable medium 911 such as a magnetic disk, an optical disc, a magneto-optical disk, and a semiconductor memory.

In the thus configured computer 900, the above-mentioned series of processing is performed by the CPU 901 loading programs stored in the ROM 902 and the recording unit 908 into the RAM 903 via the input/output interface 905 and the bus 904 and executing them.

The programs executed by the computer 900 (CPU 901) can be recorded and provided on the removable medium 911 as a package medium, for example. Further, the programs can be provided via a wired or wireless transmission medium such as a local-area network, the Internet, and digital satellite broadcasting.

In the computer 900, the programs can be installed into the recording unit 908 via the input/output interface 905 by the removable medium 911 being mounted on the drive 910. Further, the programs can be received by the communication unit 909 via the wired or wireless transmission medium and installed into the recording unit 908. Otherwise, the programs can be installed into the ROM 902 or the recording unit 908 in advance.

In the present specification, the processing executed by the computer according to the programs does not necessarily need to be performed in a time sequence in the order described as the flowchart. That is, the processing executed by the computer according to the programs includes processes executed in parallel or individually (e.g., parallel processing or processing by objects). Further, the programs may be processed by a single computer (processor) or may be processed by a plurality of computers in a distributed manner.

Note that embodiments of the present technology are not limited to the above-mentioned embodiments and various modifications can be made without departing from the gist of the present technology.

Further, the present technology may take the following configurations.

(1)

A reception apparatus, including:

a reception unit that receives a broadcast wave of digital broadcasting; and a control unit that performs, on the basis of a relationship among a plurality of elements which is prescribed in advance in an MPD (Media Presentation Description) conforming to a standard of MPEG-DASH (Moving Picture Expert Group-Dynamic Adaptive Streaming over HTTP) which is transmitted via the broadcast wave or a communication network, and a first element for grouping of target elements in a specific layer in which selection or structuring of a component having a structure including a plurality of layers for the selection and the structuring is performed, at least one of the selection and the structuring of the component, and controls reproduction of a content constituted of one or more components.

(2)

The reception apparatus according to (1), in which
the layer structure includes a first layer, a second layer, and a third layer,
the third layer is a layer for adaptive selection of the component,
the second layer is a layer for structuring of the component selected in the third layer and a component which is not a target of the third layer into one component, and
the first layer is a layer for selection of one component from among the component structured in the second layer, the component selected in the third layer, and a component which is not a target of the second layer and the third layer.

(3)

The reception apparatus according to (2), in which
a function of the third layer is achieved by using a relationship between an AdaptationSet element and a Representation element of the MPD,
a function of the second layer is achieved by grouping a plurality of elements as targets of structuring of the component by the first element, and
a function of the first layer is achieved by grouping a plurality of elements as targets of selection of the component by the first element.

(4)

The reception apparatus according to (3), in which
the first element is an EssentialProperty element or a SupplementalProperty element, and the elements as the targets to be grouped are specified by a schemeIdUri attribute and a value attribute of the EssentialProperty element or the SupplementalProperty element.

(5)

The reception apparatus according to (4), in which
the function of the second layer is achieved by grouping the component selected in the third layer and the component which is not the target of the third layer by an identical group ID.

(6)

The reception apparatus according to (4) or (5), in which
the function of the first layer is achieved by grouping the component structured in the second layer, the component selected in the third layer, and the component which is not the targets of the second layer and the third layer by an identical group ID.

(7)

The reception apparatus according to any one of (3) to (6), in which
the MPD includes a second element that specifies a set of AdaptationSet elements outside of a regulation relating to the structure including the plurality of layers.

(8)

The reception apparatus according to (7), in which
the second element is a Subset element, and
the set of the AdaptationSet elements is specified by a contains attribute of the Subset element.

(9)

The reception apparatus according to (2), in which
the function of the third layer is achieved by grouping a plurality of elements as targets of selection of the component by the first element,
the function of the second layer is achieved by grouping a plurality of elements as targets of structuring of the component by the first element, and
the function of the first layer is achieved by using a relationship between an AdaptationSet element and a Representation element of the MPD.

(10)

The reception apparatus according to (9), in which
the first element is an EssentialProperty element or a SupplementalProperty element, and
the elements as the targets to be grouped are specified by a schemeIdUri attribute and a value attribute of the EssentialProperty element or the SupplementalProperty element.

(1)

The reception apparatus according to (10), in which
the function of the third layer is achieved by grouping components adaptively selected in the third layer by an identical group ID.

(2)

The reception apparatus according to (10) or (11), in which
the function of the second layer is achieved by grouping components structured in the second layer by using a relationship between a Representation element and a Sub-Representation element of the MPD.

(3)

The reception apparatus according to any one of (9) to (12), in which
the MPD includes a second element that specifies a set of Representation elements outside of a regulation relating to the structure including the plurality of layers.

(4)

The reception apparatus according to (13), in which
the second element is a Subset element, and
the set of the Representation elements is specified by a contains attribute of the Subset element.

(5)

The reception apparatus according to any one of (1) to (14), in which
the component is transmitted via the broadcast wave or the communication network.

(6)

A reception method of a reception apparatus, including the steps of:
receiving a broadcast wave of digital broadcasting by the reception apparatus; and
performing, on the basis of a relationship among a plurality of elements which is prescribed in advance in an MPD conforming to a standard of MPEG-DASH which is transmitted via the broadcast wave or a communication network, and a first element for grouping of target elements in a specific layer in which selection or structuring of a component having a structure including a plurality of layers for the selection and the structuring is performed, at least one of the selection and the structuring of the component, and controlling reproduction of a content constituted of one or more components by the reception apparatus.

(7)

A transmission apparatus, including:
a generation unit that performs, on the basis of a relationship among a plurality of elements which is prescribed in advance in an MPD conforming to a standard of MPEG-DASH, and a first element for grouping of target elements in a specific layer in which selection or structuring of a component having a structure including a plurality of layers for the selection and the structuring is performed, at least one of the selection and the structuring of the component, and generates the MPD including at least information that enables control of reproduction of a content constituted of one or more components; and
a transmission unit that transmits the generated MPD via a broadcast wave or a communication network of digital broadcasting.

(8)

A transmission method of a transmission apparatus, including the steps of:

performing, on the basis of a relationship among a plurality of elements which is prescribed in advance in an MPD conforming to a standard of MPEG-DASH, and a first element for grouping of target elements in a specific layer in which selection or structuring of a component having a structure including a plurality of layers for the selection and the structuring is performed, at least one of the selection and the structuring of the component, and generating the MPD including at least information that enables control of reproduction of a content constituted of one or more components by the transmission apparatus; and transmitting the generated MPD via a broadcast wave or a communication network of digital broadcasting by the transmission apparatus.

DESCRIPTION OF REFERENCE NUMERALS 1 broadcast communication system, 10 channel streamer, 20 MPD providing apparatus, 30 DASH segmenter and streamer, 50 client device, 90 network, 101 content management unit, 102 content accumulation unit, 103 communication unit, 201 MPD generation unit, 202 communication unit, 203 transmission unit, 301 segment data generation unit, 302 segment metadata generation unit, 303 communication unit, 304 transmission unit, 501 control unit, 502 reception unit, 503 display, 504 speaker, 505 recording unit, 506 communication unit, 551 MPD obtaining unit, 552 component selection unit, 553 segment data obtaining unit, 554 segment data reproduction unit, 900 computer, 901 CPU

The invention claimed is:

1. A reception apparatus, comprising:
 circuitry configured to:
  receive a Media Presentation Description (MPD) metafile via one of a broadcast wave or a communication network, the MPD metafile conforming to a standard of Moving Picture Expert Group-Dynamic Adaptive Streaming over HTTP (MPEG-DASH) and the MPD metafile including a plurality of elements for defining a content, the content including one or more components of a plurality of components;
  allocate at least one of the plurality of elements defined by the MPD metafile to at least one layer of a component layer structure, by using a relationship between an AdaptationSet element and a Representation element of the plurality of elements defined in the MPD metafile, the component layer structure including a first layer, a second layer, and a third layer;
  select a target component from the plurality of components, or structure the target component as a group of components among the plurality of components, on each layer of the component layer structure; and
  reproduce the content, based on the target component,
 wherein, when the circuitry selects the target component on the first layer of the component layer structure, a first component is selected as the target component on the first layer from the plurality of components,
 wherein, when the circuitry structures the target component on the second layer of the component layer structure after selecting the target component on the first layer, a third component is structured as the target component on the second layer, based on a first group of the first component and a second component by a first group ID, the second component being other than the target component on the first layer, and
 wherein, when the circuitry selects the target component on the third layer of the component layer structure after structuring the target component on the second layer, a fifth component is selected, as the target component on the third layer, from one of the first component, the third component, or a fourth component, the fourth component being other than both of the target components on the first layer and the second layer.

2. The reception apparatus according to claim 1, wherein the circuitry is configured to structure the target component based on at least one of an EssentialProperty element or SupplementalProperty element of the plurality of elements defined in the MPD metafile, and
 a schemeIdUri attribute and a value attribute of one of the EssentialProperty element or the SupplementalProperty element are used for grouping one or more components of the plurality of components when the target component is structured.

3. The reception apparatus according to claim 1, wherein the circuitry is further configured to select the fifth component, based on a second group of the first component, the third component, and the fourth component by a second group ID.

4. The reception apparatus according to claim 1, wherein the MPD metafile comprises information that specifies a set of AdaptationSet elements outside of a regulation related to the component layer structure.

5. The reception apparatus according to claim 4, wherein the information is a Subset element, and
 a contains attribute of the Subset element specifies the set of AdaptationSet elements.

6. The reception apparatus according to claim 1, wherein the circuitry is further configured to:
 structure, on the first layer, the first component from the plurality of component allocated as Elementary components, by grouping one or more of elements of the plurality of elements defined in the MPD metafile, and
 structure, on the second layer, the first component and the second component into the third component, by grouping one or more elements of the plurality of elements defined in the MPD metafile, based on the relationship between the AdaptationSet element and the Representation element of the plurality of elements defined in the MPD metafile.

7. The reception apparatus according to claim 6, wherein the circuitry is configured to structure the target component based on at least one of an EssentialProperty element or SupplementalProperty element of the plurality of elements defined in the MPD metafile, and
 a schemeIdUri attribute and a value attribute of one of the EssentialProperty element or the SupplementalProperty element are used for grouping one or more components of the plurality of components when the target component is structured.

8. The reception apparatus according to claim 6, wherein the circuitry is configured to select the first component based on group of the plurality of Elementary components by the first group ID.

9. The reception apparatus according to claim 6, wherein the circuitry is configured to structure the fifth component based on a relationship between the Representation element and a SubRepresentation element of the plurality of elements defined in the MPD metafile.

10. The reception apparatus according to claim 6, wherein the MPD metafile includes information that specifies a set of Representation elements outside of a regulation related to the component layer structure.

11. The reception apparatus according to claim 10, wherein
the information is a Subset element, and
a contains attribute of the Subset element specifies the set of Representation elements.

12. The reception apparatus according to claim 1, wherein the circuitry is further configured to receive the plurality of components via one of the broadcast wave or the communication network.

13. The reception apparatus according to claim 1,
wherein the circuitry is configured to execute mixing the group of components, upon structuring the target component.

14. A reception method, comprising:
receiving a Media Presentation Description (MPD) metafile via one of a broadcast wave or a communication network, the MPD metafile conforming to a standard of Moving Picture Expert Group-Dynamic Adaptive Streaming over HTTP (MPEG-DASH) and the MPD metafile including a plurality of elements for defining a content, the content including one or more components of a plurality of components,
allocating at least one of the plurality of elements defined by the MPD metafile to at least one layer of a component layer structure, by using a relationship between an AdaptationSet element and a Representation element of the plurality of elements defined in the MPD metafile, the component layer structure including a first layer, a second layer, and a third layer;
selecting a target component from the plurality of components, or structure the target component as a group of components among the plurality of components, on each layer of the component layer structure, and
reproducing the content, based on the target component,
wherein, when selecting the target component on the first layer of the component layer structure, a first component is selected as the target component on the first layer, from the plurality of components,
wherein, when structuring the target component on the second layer of the component layer structure after selecting the target component on the first layer, a third component is structured as the target component, based on a first group of the first component and a second component, on the second layer by a first group ID, the second component being other than the target component on the first layer, and
wherein, when selecting the target component on the third layer of the component layer structure after structuring the target component on the second layer, a fifth component is selected, as the target component, from one of the first component, the third component, or a fourth component, on the third layer of the component layer structure, the fourth component being other than both of the target components on the first layer and the second layer.

15. The reception method according to claim 14, further comprising selecting the fifth component, based on a second group of the first component, the third component, and the fourth component by a second group ID.

16. A transmission apparatus, comprising:
circuitry configured to:
obtain metadata of a content from a channel streamer, wherein the metadata comprises a plurality of components;
obtain segment metadata from a DASH segmenter and streamer, wherein the segment metadata is based on the stream data;
generate a Media Presentation Description (MPD) metafile including a plurality of elements for defining the content, based on the metadata of the content and the segment metadata; and
transmit the MPD metafile via one of a broadcast wave or a communication network,
wherein the MPD metafile comprises control information for reproduction of the content,
wherein the content includes one or more components of the plurality of components; and
wherein at least one of the plurality of elements defined in the MPD metafile is allocated to at least one layer of a component layer structure, by using a relationship between an AdaptationSet element and a Representation element of the plurality of elements defined in the MPD metafile, the component layer structure including a first layer, a second layer, and a third layer,
wherein a target component is selected, or structured as a group of components among the plurality of components on each layer of the component layer structure,
wherein, when the target component on the first layer of the component layer structure is selected, a first component is selected as the target component on the first layer from the plurality of components,
wherein, when the target component on the second layer of the component layer structure is structured after the target component on the first layer is selected, a third component is structured as the target component on the second layer, based on a first group of the first component and a second component by a first group ID, the second component being other than the target component on the first layer, and
wherein, when the target component on the third layer of the component layer structure is selected after the target component on the second layer is structured, a fifth component is selected, as the target component on the third layer, from one of the first component, the third component, or a fourth component, the fourth component being other than both of the target components on the first layer and the second layer.

17. A transmission method, comprising:
obtaining metadata of a content including one or more components of a plurality of components, from a channel streamer, wherein the metadata comprises a plurality of components;
obtaining segment metadata from a DASH segmenter and streamer, wherein the segment metadata is based on the stream data;
generating a Media Presentation Description (MPD) metafile including a plurality of elements for defining the content, based on the metadata of the content and the segment metadata; and
transmitting MPD metafile via one of a broadcast wave or a communication network,
wherein the MPD metafile comprises control information for reproduction of the content; and
wherein at least one of the plurality of elements defined in the MPD metafile is allocated to at least one layer of a component layer structure, by using a relationship between an AdaptationSet element and a Representation element of the plurality of elements defined in the MPD metafile, the component layer structure including a first layer, a second layer, and a third layer, wherein a target component is selected, or structured as a group of components among the plurality of components on each layer of the component layer structure, wherein, when the target component on the first layer of the component layer structure is selected, a first component is selected as the target component on the first layer from the plurality of components, wherein, when the target component on the second layer of the component layer structure is structured after the target component on the first layer is selected, a third component is structured as the target component on the second layer, based on a first group of the first component and a second component by a first group ID, the second component being other than the target component on the first layer, and wherein, when the target component on the third layer of the component layer structure is selected after the target component on the second layer is structured, a fifth component is selected, as the target component on the third layer, from one of the first component, the third component, or a fourth component, the fourth component being other than both of the target components on the first layer and the second layer.

18. A reception apparatus, comprising:

circuitry configured to:

receive a Media Presentation Description (MPD) metafile via one of a broadcast wave or a communication network, the MPD metafile conforming to a standard of Moving Picture Expert Group-Dynamic Adaptive Streaming over HTTP (MPEG-DASH) and the MPD metafile including a plurality of elements for defining a content, the content including one or more components of a plurality of components, allocate at least one of the plurality of elements defined by the MPD metafile to at least one layer of a component layer structure, by using a relationship between an AdaptationSet element and a Representation element of the plurality of elements defined in the MPD metafile, the component layer structure including a first layer, a second layer, and a third layer;

select a target component of from the plurality of components, or structure the target component as a group of components among the plurality of components, on each layer of the component layer structure; and wherein the circuitry is configured to select the target component based on at least one of an EssentialProperty element or a SupplementalProperty element of the plurality of elements defined in the MPD metafile, wherein, when the circuitry selects the target component on the first layer of the component layer structure, a first component is selected as the target component on the first layer from the plurality of components, wherein, when the circuitry structures the target component on the second layer of the component layer structure after selecting the target component on the first layer, a third component is structured as the target component on the second layer, based on a first group of the first component and a second component by a first group ID, the second component being other than the target component on the first layer, and wherein, when the circuitry selects the target component on the third layer of the component layer structure after structuring the target component on the second layer, a fifth component is selected, as the target component on the third layer, from one of the first component, the third component, or a fourth component, the fourth component being other than both of the target components on the first layer and the second layer.

* * * * *